(12) United States Patent
Teplow et al.

(10) Patent No.: US 12,316,594 B2
(45) Date of Patent: *May 27, 2025

(54) GENERATING INTERACTIVE EMAILS AND TRACKING USER INTERACTIONS

(71) Applicant: Salesforce, Inc., San Francisco, CA (US)

(72) Inventors: Joe Teplow, New York, NY (US); Scott Motte, Los Angeles, CA (US); Kevin Dutra, New York, NY (US); Mark Robbins, Brighton (GB); Yamil Asusta, San Juan, PR (US); Devin Torres, Austin, TX (US); Steven Collins, New York, NY (US); Trever Faden, Washington, DC (US); Derek Jacobi, New York, NY (US); Selby Kendrick, New York, NY (US); Johnny Omar Mejias Luciano, New York, NY (US); Adam Beckerman, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,172

(22) Filed: Jun. 15, 2023

(65) Prior Publication Data

US 2023/0421523 A1    Dec. 28, 2023

Related U.S. Application Data

(63) Continuation of application No. 17/144,542, filed on Jan. 8, 2021, now Pat. No. 11,757,819, which is a
(Continued)

(51) Int. Cl.
*H04L 51/42*    (2022.01)
*G06F 3/04842*    (2022.01)
(Continued)

(52) U.S. Cl.
CPC .......... *H04L 51/42* (2022.05); *G06F 3/04842* (2013.01); *G06F 3/14* (2013.01);
(Continued)

(58) Field of Classification Search
CPC ... H04L 51/22; G06F 16/958; G06F 3/04842; G06F 3/14; G06F 3/147; G06F 17/218;
(Continued)

(56) References Cited

U.S. PATENT DOCUMENTS

2008/0278740 A1    11/2008    Bird
2009/0228807 A1*    9/2009    Lemay ................. G06F 3/0488
715/752
(Continued)

OTHER PUBLICATIONS

Justin Khoo: "Interactive Shopping Widget for Email", FreshInbox, Jan. 11, 2016 (Jan. 11, 2016), XP055623177, Retrieved from the Internet: [retrieved on Sep. 17, 2019] URL:https://web.archive.org/web/20160111191737/https ://freshinbox. com/ blog/shopping-in-email-add-to-cart/ (Year: 2016).*

(Continued)

*Primary Examiner* — Jonathan A Bui
(74) *Attorney, Agent, or Firm* — Butzel Long

(57) ABSTRACT

Systems, methods, and related technologies are provided for generating interactive emails and tracking user interactions. In one implementation, an email can be received within an email client. The email can be rendered within the email client, such as by: presenting a first selectable element within the email client, presenting a second selectable element within the email client, and presenting one or more content items within the email client. A selection of the first selectable element can be received within the email client. In response to the selection of the first selectable element, a presentation of the one or more content items can be adjusted within the email client.

25 Claims, 28 Drawing Sheets

Related U.S. Application Data continuation of application No. 15/999,310, filed as application No. PCT/US2017/018462 on Feb. 17, 2017, now Pat. No. 10,951,569.

(60) Provisional application No. 62/296,144, filed on Feb. 17, 2016.

(51) Int. Cl.
| | |
|---|---|
| *G06F 3/14* | (2006.01) |
| *G06F 3/147* | (2006.01) |
| *G06F 16/958* | (2019.01) |
| *G06F 40/117* | (2020.01) |
| *G06F 40/131* | (2020.01) |
| *G06F 40/197* | (2020.01) |
| *G06Q 10/06* | (2023.01) |
| *G06Q 10/08* | (2024.01) |
| *G06Q 10/10* | (2023.01) |
| *H04L 67/50* | (2022.01) |
| *H04M 1/7243* | (2021.01) |

(52) U.S. Cl.
CPC ............ *G06F 3/147* (2013.01); *G06F 16/958* (2019.01); *G06F 40/117* (2020.01); *G06F 40/131* (2020.01); *G06F 40/197* (2020.01); *G06Q 10/06* (2013.01); *G06Q 10/08* (2013.01); *G06Q 10/10* (2013.01); *H04L 67/535* (2022.05); *H04M 1/7243* (2021.01)

(58) Field of Classification Search
CPC . G06F 17/2229; G06F 17/2288; G06Q 10/06; G06Q 10/08; G06Q 10/10
See application file for complete search history.

(56) References Cited

U.S. PATENT DOCUMENTS

| | | | | |
|---|---|---|---|---|
| 2010/0095237 | A1* | 4/2010 | Turakhia | G06Q 30/02 715/781 |
| 2011/0066692 | A1* | 3/2011 | Ciancio-Bunch | H04L 51/234 709/206 |
| 2011/0072114 | A1 | 3/2011 | Hoffert | |
| 2011/0179362 | A1* | 7/2011 | Craddock | H04L 51/08 715/752 |
| 2011/0196933 | A1* | 8/2011 | Jackson | H04L 51/00 709/206 |
| 2012/0010995 | A1 | 1/2012 | Skirpa | |
| 2012/0191577 | A1* | 7/2012 | Gonsalves | G06Q 30/0643 705/27.2 |
| 2012/0253896 | A1 | 10/2012 | Killoran, Jr. | |
| 2013/0007144 | A1 | 1/2013 | Ahern | |
| 2013/0297581 | A1* | 11/2013 | Ghosh | G06F 16/9536 707/706 |
| 2014/0244734 | A1* | 8/2014 | Nutt | H04L 51/046 709/203 |
| 2014/0310608 | A1* | 10/2014 | Snyder | G06Q 10/1093 715/738 |
| 2015/0121202 | A1* | 4/2015 | Saund | H04L 51/10 715/249 |
| 2015/0156151 | A1 | 6/2015 | Sheory | |
| 2015/0161087 | A1* | 6/2015 | Khoo | G06F 16/957 715/234 |
| 2015/0200878 | A1 | 7/2015 | Shih | |
| 2015/0304250 | A1 | 10/2015 | Zomet | |
| 2017/0161716 | A1 | 6/2017 | Hurley | |
| 2018/0302355 | A1* | 10/2018 | Nutt | G06Q 10/107 |

OTHER PUBLICATIONS

Justin Khoo: "Interactive Shopping Widget for Email", FreshInbox, Jan. 11, 2016 (Jan. 11, 2016), XP055623177, Retrieved from the Internet: URL:https://web.archive.org/web/20160111191737/https://freshinbox.com/blog/shopping-in-email-add-to-cart/ [retrieved on Sep. 17, 2019].

Justin Khoo: "3 Steps to Create an Interactive Email Using CSS", FreshInbox, Dec. 19, 2013 (Dec. 19, 2013), XP055623186, Retrieved from the Internet: URL:https://freshinbox.com/blog/3-steps-to-create-an-interactive-email-using-css/ [retrieved on Sep. 17, 2019].

Anonymous: "Interactive Tabs for Email", FreshInbox, Jan. 30, 2016 (Jan. 30, 2016), XP055623136, Retrieved from the Internet: URL:https://web.archive.org/web/20160130174736/https://freshinbox.com/blog/interactive-tabs-for-email/ [retrieved on Sep. 17, 2019].

Alex Ilhan: "Hamburger Menus in Email", Email on Acid, Nov. 5, 2015 (Nov. 5, 2015), XP055623111, Retrieved from the Internet: URL:https://www.emailonacid.com/blog/article/email-development/alternative-uses-for-hamburger-menus-in-email/ [retrieved on Sep. 17, 2019].

Alex Ilhan: "Fulltext and screen shots of web page: https://www.emailonacid.com/blog/article/email-development/alternative-uses-for-hamburger-menus-in-email/", Email on Acid, Nov. 5, 2015 (Nov. 5, 2015), XP055623388, Retrieved from the Internet: URL: https://www.emailonacid.com/blog/article/email-development/alternative-uses-for-hamburger-menus-in-email/ [retrieved on Sep. 18, 2019].

Extended European Search Report for Application No. EP17753963.2, dated Sep. 26, 2019, 10 pages.

Supplementary European Search Report for Application No. EP17753963.2, dated Oct. 15, 2019, 8 pages.

European Patent Office Communication pursuant to Article 94(3) EPC for App. No. EP17753963.2, dated Oct. 28, 2021, 11 pages.

Guerriero Sebastiano: "Content Filter—A slide-in filter panel powered by CSS and jQuery", Mar. 12, 2015 (Mar. 12, 2015), XP055854171, Retrieved from the Internet: URL:https://web.archive.org/web/20150312203016/http://codyhouse.co/gem/content-filter/ [retrieved on Oct. 22, 2021].

Guerriero Sebastiano: "Content Filter—A slide-in filter panel powered by CSS and jQuery—DEMO", Apr. 5, 2015 (Apr. 5, 2015), XP055854166, Retrieved from the Internet: URL:https://web.archive.org/web/20150405210548/http://codyhouse.co/demo/content-filter/index.html#0 [retrieved on Oct. 22, 2021].

Summons to Attend Oral Proceedings Pursuant to Rule 115(1) EPC issued in App. No. EP17753963.2, dated Aug. 9, 2022, 14 pages.

\* cited by examiner

```
<!--[if mso]><!-->
<form action="thunderbird" role="presentation">
   <div class="filter filtertest1" style="text-align:center;font-family:helvetica;">
      <!--  ######  -->
      <div class="filter-interactive">
         <h3 class="filterTitle">Select Color</h3>
      </div>
      <input type="radio" name="Color" style="display:none !important;"
id="filtercolorselected" class="hide-input">
      <label>
         <input type="radio" name="Color" style="display:none !important;"
id="filtercolorred" class="hide-input">
8A02    <div class="filter-select" role="button" tabindex="0" style="display:none;max-
height:0;overflow:hidden;mso-hide:all;">Red</div>
         <label>
            <input type="radio" name="Color" style="display:none !important;"
id="filtercolorblue" class="hide-input">
            <div class="filter-select" role="button" tabindex="0"
style="display:none;max-height:0;overflow:hidden;mso-hide:all;">Blue</div>
            <label>
               <input type="radio" name="Color" style="display:none !important;"
id="filtercolorgreen" class="hide-input">
               <div class="filter-select" role="button" tabindex="0"
style="display:none;max-height:0;overflow:hidden;mso-hide:all;">Green</div>
               <label>
                  <input type="radio" name="Color" style="display:none !important;"
class="hide-input" id="filtercolorreset">
                  <div class="filter-reset" role="button" tabindex="0"
style="display:none;max-height:0;overflow:hidden;mso-hide:all;">Reset</div>
                  <div class="filterspacer"></div>
                  <label for="null">
                     <div class="filterspacer"></div>
                     <!--  ######  -->
                     <div class="filter-interactive" style="display:none;max-
height:0;overflow:hidden;mso-hide:all;">
                        <h3 class="filterTitle">Select Size</h3>
                     </div>
                     <input type="radio" name="Size" style="display:none !important;"
id="filtersizeselected" class="hide-input">
                        <label>
                           <input type="radio" name="Size" style="display:none !important;"
id="filtersizesmall" class="hide-input">
                           <div class="filter-select" role="button" tabindex="0"
style="display:none;max-height:0;overflow:hidden;mso-hide:all;">Small</div>
                           <label>
                              <input type="radio" name="Size" style="display:none !important;"
id="filtersizemedium" class="hide-input">
                              <div class="filter-select" role="button" tabindex="0"
style="display:none;max-height:0;overflow:hidden;mso-hide:all;">Medium</div>
                              <label>
                                 <input type="radio" name="Size" style="display:none !important;"
id="filtersizelarge" class="hide-input">
                                 <div class="filter-select" role="button" tabindex="0"
style="display:none;max-height:0;overflow:hidden;mso-hide:all;">Large</div>
                                 <label>
                                    <input type="radio" name="Size" style="display:none
!important;" class="hide-input" id="filtersizereset">
                                    <div class="filter-reset" role="button" tabindex="0"
style="display:none;max-height:0;overflow:hidden;mso-hide:all;">Reset</div>
                                    <div class="filterspacer"></div>
                                    <label for="null">
                                       <div class="filterspacer"></div>
                                       <!--  ######  -->
```

(Continued from FIG. 8A)

```
<div class="filter-interactive" style="display:none;max-height:0;overflow:hidden;mso-hide:all;">
                        <h3 class="filterTitle">Select Price</h3>
                        </div>
                        <input type="radio" name="Price" style="display:none
!important;" id="filterpriceselected" class="hide-input">
                        <label>
                            <input type="radio" name="Price" style="display:none
!important;" id="filterpricecheap" class="hide-input">
                            <div class="filter-select" role="button" tabindex="0"
style="display:none;max-height:0;overflow:hidden;mso-hide:all;">Cheap</div>
                            <label>
                                <input type="radio" name="Price" style="display:none
!important;" id="filterpriceexpensive" class="hide-input">
                                <div class="filter-select" role="button" tabindex="0"
style="display:none;max-height:0;overflow:hidden;mso-hide:all;">Expensive</div>
                                <label>
                                    <input type="radio" name="Price" style="display:none
!important;" class="hide-input" id="filterpricereset">
                                    <div class="filter-reset" role="button" tabindex="0"
style="display:none;max-height:0;overflow:hidden;mso-hide:all;">Reset</div>
                                    <div class="filterspacer"></div>
                                    <label for="null">
                                        <div class="filterspacer"></div>
                                        <!-- ###### -->
                                        <button type="reset" style="display:none;"
id="resetAll" class="filter-reset">Reset all</button>
                                        <h3 class="filterTitle">
                                          View your products below
                                        </h3>
                                        <label style="display:block;" class="filterproducts">
                                            <div style="min-height:200px;overflow:hidden;">
                                                <div style="background:#ffffff;line-
height:initial;column-width:auto" class="filterwrapper">
                                                    <div class="product filterred filtersmall
filterexpensive filtercolor filtersize filterprice ">
                                                        <div class="filterimg0"><div role="img" aria-
label=""></div></div>
                                                    </div>
                                                    <div class="product filterred filtersmall
filtercheap filtercolor filtersize filterprice ">
                                                        <div class="filterimg1"><div role="img" aria-
label=""></div></div>
                                                    </div>
                                                    <div class="product filterblue filtersmall
filterexpensive filtercolor filtersize filterprice ">
                                                        <div class="filterimg2"><div role="img" aria-
label=""></div></div>
                                                    </div>
                                                    <div class="product filterblue filterlarge
filterexpensive filtercolor filtersize filterprice ">
                                                        <div class="filterimg3"><div role="img" aria-
label=""></div></div>
                                                    </div>
                                                    <div class="product filtergreen filterlarge
filterpricenull filtercolor filtersize filterprice ">
                                                        <div class="filterimg4"><div role="img" aria-
label=""></div></div>
                                                    </div>
                                                    <div class="product filtergreen filterlarge
filtercheap filtercolor filtersize filterprice ">
                                                        <div class="filterimg5"><div role="img" aria-
label=""></div></div>
```

(Continued from FIG. 8B)

```
</div>
                                        <div style="display:inline-block
!important;width:100%;height:1px;clear:both;"></div>
                                        </div>
                                        <div style="max-height:0;">
                                          <div style="font-size: 20px;line-height:
initial;" class="noMatchMessage">
                                            You've filtered out all the products
                                          </div>
                                        </div>
                                       </div>
                                      </label>
                                     </label>
                                    </label>
                                   </label>
                                  </label>
                                 </label>
                                </label>
                               </label>
                              </label>
                             </label>
                            </label>
                           </label>
                          </label>
                         </label>
                        </label>
                       </label>
                     </div>
</form>
<!--<![endif]-->
```

```
.filter #filtercolorselected:checked +* #filtercolorblue + .filter-
select,
.filter #filtersizeselected:checked +* #filtersizemedium + .filter-
select,
.filter #filterpriceselected:checked +* #filterpricecheap + .filter-
select,                                           ⎯ 8D02
.filtertest1 input:checked + .filter-select {
    background-color: #436f44;
    color: #ffffff;
}
.filtertest1 #filtercolorred:checked +*+* .filterblue,
.filtertest1 #filtercolorred:checked +*+* .filtergreen,
.filtertest1 #filtercolorblue:checked +*+* .filterred,
.filtertest1 #filtercolorblue:checked +*+* .filtergreen,
.filtertest1 #filtercolorgreen:checked +*+* .filterred,
.filtertest1 #filtercolorgreen:checked +*+* .filterblue,
.filtertest1 #filtersizesmall:checked +*+* .filtermedium,
.filtertest1 #filtersizesmall:checked +*+* .filterlarge,
.filtertest1 #filtersizemedium:checked +*+* .filtersmall,
.filtertest1 #filtersizemedium:checked +*+* .filterlarge,
.filtertest1 #filtersizelarge:checked +*+* .filtersmall,
.filtertest1 #filtersizelarge:checked +*+* .filtermedium,
.filtertest1 #filterpricecheap:checked +*+* .filterexpensive,
.filtertest1 #filterpricecheap:checked +*+* .filterpricenull,
.filtertest1 #filterpriceexpensive:checked +*+* .filtercheap,
.filtertest1 #filterpriceexpensive:checked +*+* .filterpricenull,
.filtertest1 #filterpricepricenull:checked +*+* .filtercheap,
.filtertest1 #filterpricepricenull:checked +*+* .filterexpensive,
.null {
    max-height: 0;
    max-width: 0;
}
```

FIG. 8D

Select Color

8E04A

Red  Blue  Green  Reset

Select Size

8E04B

Small  Medium  Large  Reset

Select Price

8E04C

Cheap  Expensive  Reset

Reset All

View your products below

8E06A

| [Red] [Small] [Expensive] | [Red] [Small] [Cheap] | [Blue] [Small] [Expensive] | [Blue] [Small] [Cheap] | [Green] [Large] [No Price] | 8E06B [Green] [Large] [Cheap] |

*FIG. 8E*

Select Color
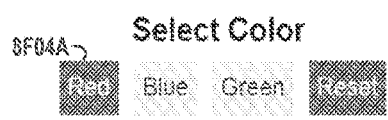
8F04A
Select Size
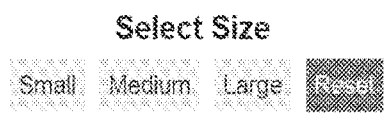
Select Price
View your products below
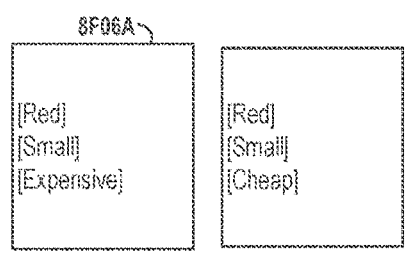
8F06A
FIG. 8F

```
<input type="radio" name="translate" id="english" checked>
<label for="english">English</label>
<input type="radio" name="translate" id="italian">
<label for="italian">Italiano</label>
<input type="radio" name="translate" id="french">
<label for="french">Français</label>
<input type="radio" name="translate" id="thai">
<label for="thai">ไทย</label>
<h1>
   <span lang="en">Modern CSS and interactive email</span>
   <span lang="it">Moderna CSS email interattivo</span>
   <span lang="fr">CSS moderne et email interactive</span>
   <span lang="th">CSS โมเดิร์น และอีเมล์ โต้ตอบ</span>
</h1>

<h2>
   <span lang="en">What is interactive email?</span>
   <span lang="it">Qual è la posta elettronica interattivo?</span>
   <span lang="fr">Qu'est-ce courriel interactif?</span>
   <span lang="th">อีเมล โต้ตอบ อะไร</span>
</h2>

<p>
   <span lang="en">An action taken in an email that triggers an event within the same email.</span>
   <span lang="it">Un'azione presa in una email che attiva un evento all'interno della stessa email.</span>
   <span lang="fr">Une mesure prise dans un courriel qui déclenche un événement dans le même email.</span>
   <span lang="th">การดำเนินการ ดำเนินการใน อีเมล ที่ก่อให้เกิด เหตุการณ์ ในอีเมล เดียวกัน</span>
</p>
```

*FIG. 9A*

```
                    ┌─ 9B02A
  ┌─────────────────────────────────────┐
  │[name="translate"]:checked ~* [lang]{│
  │   display:none;                     │
  │}                                    │
  │ ┌#english:checked ~* [lang="en"],   │
9B02B┤#italian:checked ~* [lang="it"],  │
  │ │#french:checked ~* [lang="fr"],    │
  │ └#thai:checked ~* [lang="th"]{      │
  │   display:inline;                   │
  │ }                                   │
```
                                    ↙ 9B10

*FIG. 9B*

```
<svg xmlns="http://www.w3.org/2000/svg" style="display: none;" >
  <symbol id="star">
    <polygon points="9.9, 1.1, 3.3, 20, 19.8, 8.58, 0, 8.58, 16.5, 20"/>
  </symbol>
</svg>
<div class="ratingContainer" style="font-size:0;">
  <label>
    <input type="radio" name="ratingName" value="5">
    <span>
      <label>
        <input type="radio" name="ratingName" value="4">
        <span>
          <label>
            <input type="radio" name="ratingName" value="3">
            <span>
              <label>
                <input type="radio" name="ratingName" value="2">
                <span>
                  <label>
                    <input type="radio" name="ratingName" value="1">
                    <span>
                      <div class="ratingIcon">
                        <svg viewBox="0 0 20 20"><use xlink:href="#star" />*</svg>
                      </div>
                    </span>
                  </label>
                  <div class="ratingIcon">
                    <svg viewBox="0 0 20 20"><use xlink:href="#star" />*</svg>
                  </div>
                </span>
              </label>
              <div class="ratingIcon">
                <svg viewBox="0 0 20 20"><use xlink:href="#star" />*</svg>
              </div>
            </span>
          </label>
          <div class="ratingIcon">
            <svg viewBox="0 0 20 20"><use xlink:href="#star" />*</svg>
          </div>
        </span>
      </label>
      <div class="ratingIcon">
        <svg viewBox="0 0 20 20"><use xlink:href="#star" />*</svg>
      </div>
    </span>
  </label>
</div>
```

*FIG. 11A*

```
.ratingIcon {
  display: inline-block;
  width:10%;
  padding: 0 2%;
  fill:gray;
}                   ⎯ 11B02A
.ratingIcon:hover {
  fill:pink !important;
}
                                                    ⎯ 11B02B
.ratingContainer label:hover label:not(:hover) .ratingIcon {
  fill:blue;
}
                                                    ⎯ 11B02C
.ratingContainer label:not(:hover) input:checked + span div {
  fill:orange;
}
```

*FIG. 11B*

```
<form style="padding:10px;font-family:helvetica;">

<input type="radio" name="q"  id="q1-nxt" checked>
  <input type="radio" name="q"  id="q2-nxt">
  <input type="radio" name="q"  id="q3-nxt">
  <input type="radio" name="q"  id="fin">

<input type="radio" name="q1" id="inact-q1">
  <input type="radio" name="q2" id="inact-q2">
  <input type="radio" name="q3" id="inact-q3">

<input type="radio" name="q1" id="q1-a1" class="_q1">
  <input type="radio" name="q1" id="q1-a2" class="_q1">

<input type="radio" name="q2" id="q2-a1" class="_q2">
  <input type="radio" name="q2" id="q2-a2" class="_q2">

<input type="radio" name="q3" id="q3-a1" class="_q3">
  <input type="radio" name="q3" id="q3-a2" class="_q3">

<div class="q1">
    <h2>what would you like to drink?</h2>
    <div class="sl">
      <label for="q1-a1">COFFEE</label>
      <label for="q1-a2">SODA</label>
    </div>
    <div class="rm">
      <label for="inact-q1" class="q1-a1-def">NEXT</label>
      <label for="q2-nxt" class="q1-a1-btn btn">NEXT</label>
      <label for="q3-nxt" class="q1-a2-btn btn">NEXT</label>
    </div>
  </div>

<!-- ################################################### -->

<div class="q2">
    <h2>would you like milk and sugar</h2>
    <div class="sl">
      <label for="q2-a1">milk only</label>
      <label for="q2-a2">milk and sugar</label>
    </div>
    <div class="rm">
      <label for="inact-q2" class="q2-a1-def">NEXT</label>
      <label for="fin" class="q2-a1-btn btn">NEXT</label>
      <label for="fin" class="q2-a2-btn btn">NEXT</label>
    </div>
  </div>

<!-- ################################################### -->

<div class="q3">
    <h2>would you like pepsi or coke</h2>
    <div class="sl">
      <label for="q3-a1">PEPSI</label>
      <label for="q3-a2">COKE</label>
    </div>
    <div class="rm">
      <label for="inact-q3" class="q3-a1-def">NEXT</label>
      <label for="fin" class="q3-a1-btn btn">NEXT</label>
      <label for="fin" class="q3-a2-btn btn">NEXT</label>
    </div>
  </div>

(Continued from FIG. 13A)

```
<div class="fin">
    <h2>order up!</h2>
    <div class="al">
        <span class="q1-a1"><b>ORDER:</b> COFFEE </span>
        <span class="q1-a2"><b>ORDER:</b> SODA </span>
        <span class="q2-a1">(with milk)</span>
        <span class="q2-a2">(with milk + sugar)</span>
        <span class="q3-a1">(12oz Pepsi)</span>
        <span class="q3-a2">(12oz Coke)</span>
    </div>
    <div class="rm">
        <button type="reset">RETAKE</button>
    </div>
</div>

</form>
```

*FIG. 13B*

```
.fin .al span {                    ← 13C10
    display: none;
}
#q1-nxt:checked ~ .q1,
#q2-nxt:checked ~ .q2,
#q3-nxt:checked ~ .q3,
#fin:checked ~ .fin {
    display: block;
}
#q1-a1:checked ~* .q1-a1-btn,
#q1-a2:checked ~* .q1-a2-btn,
#q2-a1:checked ~* .q2-a1-btn,
#q2-a2:checked ~* .q2-a2-btn,
#q3-a1:checked ~* .q3-a1-btn,
#q3-a2:checked ~* .q3-a2-btn {
    display: inline-block;
}
._q1:checked ~* .q1-a1-def,
._q3:checked ~* .q3-a1-def,
._q2:checked ~* .q2-a1-def {
    display: none;
}
#q1-a1:checked ~* .q1-a1,
#q1-a2:checked ~* .q1-a2,
#q2-a1:checked ~* .q2-a1,
#q2-a2:checked ~* .q2-a2,
#q3-a1:checked ~* .q3-a1,
#q3-a2:checked ~* .q3-a2 {
    display: inline !important;
}
#q1-a1:checked ~* [for="q1-a1"],
#q1-a2:checked ~* [for="q1-a2"],
#q2-a1:checked ~* [for="q2-a1"],
#q2-a2:checked ~* [for="q2-a2"],
#q3-a1:checked ~* [for="q3-a1"],
#q3-a2:checked ~* [for="q3-a2"] {
    border-color: green;
}
#inact-q1:checked ~* .sl label,
#inact-q2:checked ~* .sl label,
#inact-q3:checked ~* .sl label {
    border-color: rgba(255, 0, 0, 0.25);
}
```

*FIG. 13C*

GENERATING INTERACTIVE EMAILS AND TRACKING USER INTERACTIONS

PRIORITY CLAIM

This application is related to and claims the benefit of priority to U.S. patent application Ser. No. 17/144,542, filed Jan. 8, 2021, and issued as U.S. Pat. No. 11,757,819, which claims benefit of priority to U.S. patent application Ser. No. 15/999,310, filed Aug. 17, 2018, and issued as U.S. Pat. No. 10,951,569, which claims benefit of priority to a 371 of international PCT Application No. PCT/US17/18462, filed Feb. 17, 2017, which claims benefit of priority to U.S. Patent Application No. 62/296,144, filed Feb. 17, 2016, which is incorporated herein by reference in its entirety.

TECHNICAL FIELD

Aspects and implementations of the present disclosure relate to data processing and, more specifically, but without limitation, to generating interactive emails and tracking user interactions.

BACKGROUND

Various technologies may enable tracking of whether or not various recipients opened/viewed an email. In doing so an administrator can assess how successful an email campaign has been.

BRIEF DESCRIPTION OF THE DRAWINGS

FIGS. 8A-8F illustrate various example elements and example scenarios described herein, according to various example embodiments.

FIGS. 9A-9D illustrate various example elements and example scenarios described herein, according to various example embodiments.

FIGS. 11A-11D illustrate various example elements and example scenarios described herein, according to various example embodiments.

DETAILED DESCRIPTION

Figure 1:
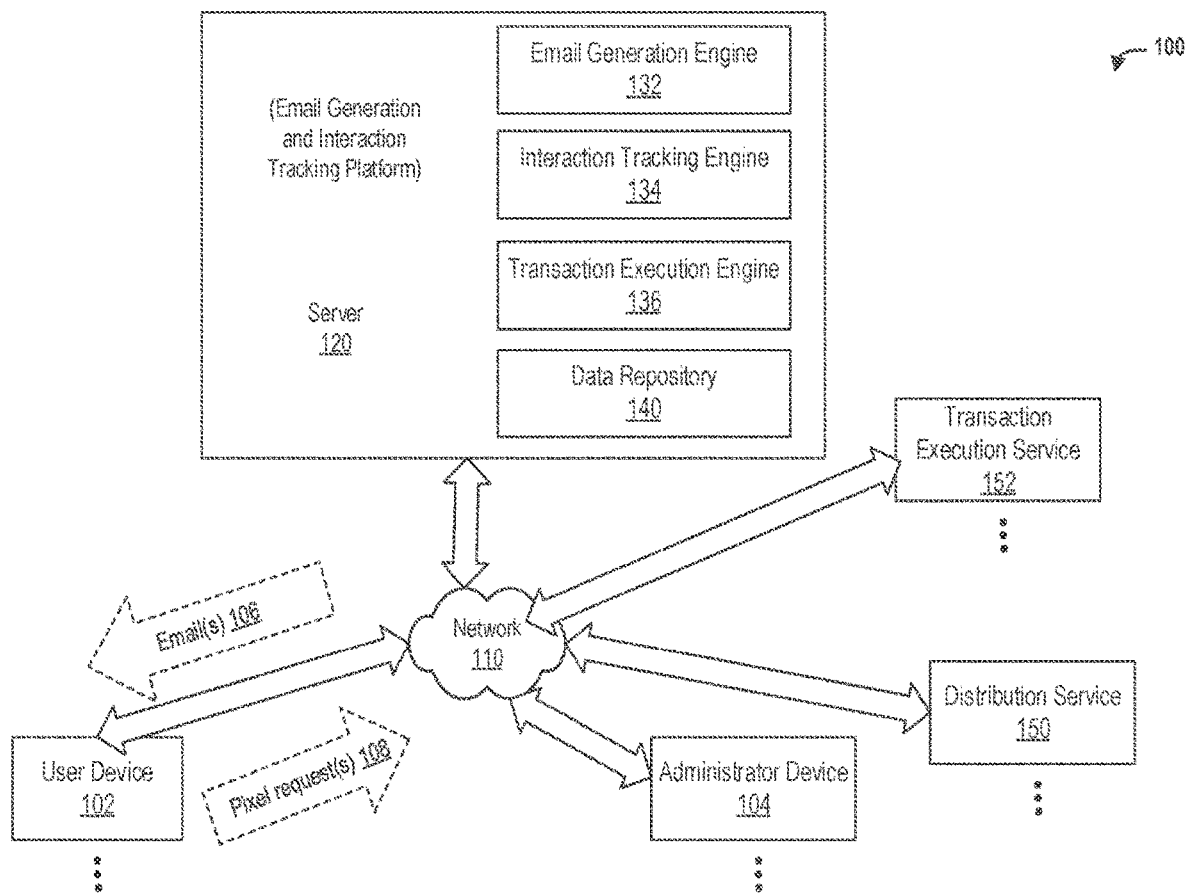
FIG. 1 illustrates an example system, in accordance with an example embodiment.

Aspects and implementations of the present disclosure are directed to generating interactive emails and tracking user interactions. The systems and methods disclosed can be applied to digital media content such as emails, electronic messages, web pages, digital media (e.g., images, video, etc.), such as those that can be disseminated and/or viewed within various contexts such as on mobile computing devices, laptop/desktop computers, etc. More particularly, it can be appreciated that email messages can be presented to/viewed by users via various email client applications. However, such email clients provide little or no ability to track the manner in which such users interact with the emails they receive (beyond, under certain circumstances, tracking that the email was opened and/or that the user clicked a link included in the email).

Accordingly, described herein are technologies that enable the tracking of various user interactions with emails (e.g., while such emails are viewed/presented within the referenced email clients). Additionally, the described technologies enable content providers (which may disseminate content via email) to generate emails which include such interactive capabilities.

In certain implementations, the referenced interactions can be identified, tracked, etc., using techniques including but not limited to pixel tracking. For example, as described herein, an email can be generated with a unique/different pixel corresponding to each interaction that a user is capable of initiating with respect a particular email. Each respective interaction can correspond to a pixel such that when the interaction occurs, data corresponding to the pixel (e.g., an image) can be requested from a server. In doing so, those interactions that are performed can be tracked (by virtue of the requests for the corresponding pixels being received by the server).

At this juncture it should be understood that various implementations of the disclosed technologies provide numerous advantages and improvements upon conventional approaches. As noted, while existing technologies may enable an administrator to track whether or not various recipients opened/viewed an email, such technologies do not enable the tracking of whether and/or how the recipient interacted with the content of the email itself. In contrast, the technologies described herein enable each user interaction with the email to be tracked. In doing so, an administrator can gain access to considerable additional insight regarding the manner in which user(s) respond to an email campaign. Additionally, based on such insight, subsequent email campaigns can be generated in a manner that improves user engagement.

It can therefore be appreciated that the described technologies are directed to and address specific technical challenges and longstanding deficiencies in multiple technical areas, including but not limited to content generation, interaction tracking, content rendering and presentation, and secure transaction execution. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 depicts an illustrative system architecture 100, in accordance with one implementation of the present disclosure. The system architecture 100 includes one or more user device(s) 102, administrator device(s) 104, server machine 120, and email distribution service(s) 150. These various elements or components can be connected to one another via network 110, which can be a public network (e.g., the Internet), a private network (e.g., a local area network (LAN) or wide area network (WAN)), or a combination thereof. Additionally, in certain implementations various elements may communicate and/or otherwise interface directly with one another.

User device 102 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein (including a virtual device such as a virtual machine). Various applications, such as mobile applications ('apps') (e.g., an email client), web browsers, etc. (not shown) may run on the user device (e.g., on the operating system of the user device). It should be understood that, in certain implementations, user device 102 can also include and/or incorporate various sensors and/or communications interfaces (including but not limited to those depicted in FIG. 2 and/or described herein). Examples of such sensors include but are not limited to: accelerometer, gyroscope, compass. GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface. NFC interface, etc.

Figure 2:
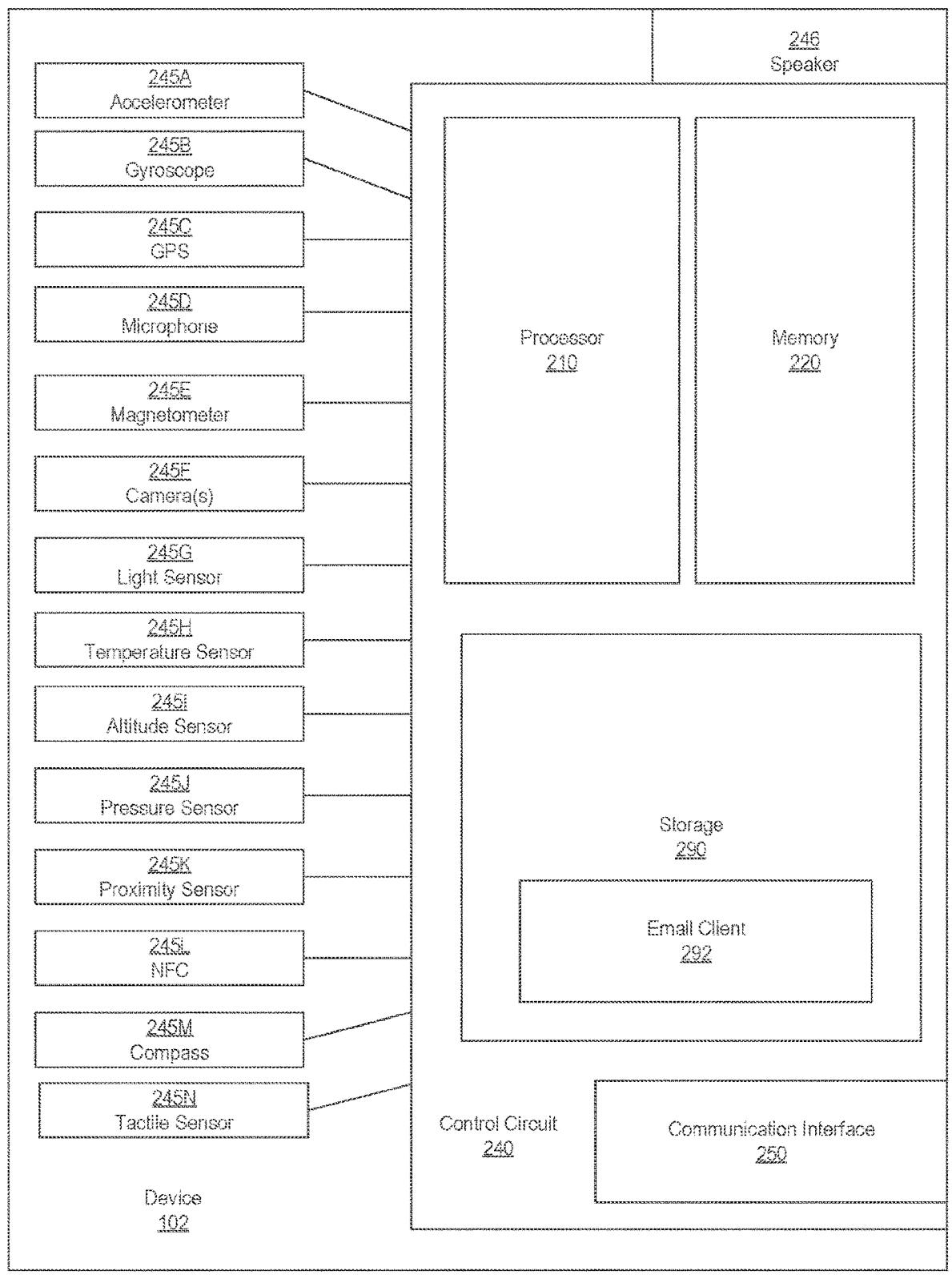
FIG. 2 illustrates an example device, in accordance with an example embodiment.

As noted, in certain implementations, user device(s) 102 can also include and/or incorporate various sensors and/or communications interfaces. By way of illustration, FIG. 2 depicts one exemplary implementation of user device 102. As shown in FIG. 2, device 102 can include a control circuit 240 (e.g., a motherboard) which is operatively connected to various hardware and/or software components that serve to enable various operations, such as those described herein. Control circuit 240 can be operatively connected to processor 210 and memory 220. Processor 210 serves to execute instructions for software that can be loaded into memory 220. Processor 210 can be a number of processors, a multi-processor core, or some other type of processor, depending on the particular implementation. Further, processor 210 can be implemented using a number of heterogeneous processor systems in which a main processor is present with secondary processors on a single chip. As another illustrative example, processor 210 can be a symmetric multi-processor system containing multiple processors of the same type.

Memory 220 and/or storage 290 may be accessible by processor 210, thereby enabling processor 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above. Storage 290 also can be fixed or removable. Additionally, in certain implementations storage 290 can include email client 292 which can be, for example, an application, module, etc., that, when executed, enables configures the device to provide/present the described email client application. It should be noted that while in certain implementations the referenced email client can be a standalone application (e.g., a desktop or mobile application), in other implementations email client can be a web-based interface (as presented within a web browser executing on the referenced device) through which emails can be presented, interacted with, etc.

A communication interface 250 is also operatively connected to control circuit 240. Communication interface 250 can be any interface (or multiple interfaces) that enables communication between user device 102 and one or more external devices, machines, services, systems, and/or elements (including but not limited to those depicted in FIG. 1 and described herein). Communication interface 250 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 102 to other computing devices, systems, services, and/or communication networks such as the Internet. Such connections can include a wired connection or a wireless connection (e.g. 802.11) though it should be understood that communication interface 250 can be practically any interface that enables communication to/from the control circuit 240 and/or the various components described herein.

At various points during the operation of described technologies, device 102 can communicate with one or more other devices, systems, services, servers, etc., such as those depicted in FIG. 1 and/or described herein. Such devices, systems, services, servers, etc., can transmit and/or receive data to/from the user device 102, thereby enhancing the operation of the described technologies, such as is described in detail herein. It should be understood that the referenced devices, systems, services, servers, etc., can be in direct communication with user device 102, indirect communication with user device 102, constant/ongoing communication with user device 102, periodic communication with user device 102, and/or can be communicatively coordinated with user device 102, as described herein.

Also connected to and/or in communication with control circuit 240 of user device 102 are one or more sensors 245A-245N (collectively, sensors 245). Sensors 245 can be various components, devices, and/or receivers that can be incorporated/integrated within and/or in communication with user device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein.

At this juncture it should be noted that while the foregoing description (e.g., with respect to sensors 245) has been directed to user device 102, various other devices, systems, servers, services, etc. (such as are depicted in FIG. 1 and/or described herein) can similarly incorporate the components, elements, and/or capabilities described with respect to user device 102. For example, administrator device 104 may also incorporate one or more of the referenced components, elements, and/or capabilities. It should also be understood that certain aspects and implementations of various devices, systems, servers, services, etc., such as those depicted in FIG. 1 and/or described herein, are also described in greater detail below in relation to FIG. 15.

Administrator device 104 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. Various applications, such as mobile applications ('apps'), web browsers, etc. (not shown) may run on the administrator device (e.g., on the operating system of the administrator device). Moreover, in certain implementations administrator device 104 can interact with and/or provide instructions to server machine 120 and/or email distribution service 150, such as in order to define email campaigns that can be delivered to user devices 102. It should be understood that, in certain implementations, administrator device 104 can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc. It should be understood that, in certain implementations, administrator device 104 can also include and/or incorporate various sensors and/or communications interfaces (including but not limited to those depicted in FIG. 2 and described in relation to user device 102).

Server machine 120 can be a rackmount server, a router computer, a personal computer, a portable digital assistant, a mobile phone, a laptop computer, a tablet computer, a camera, a video camera, a netbook, a desktop computer, a smartphone, any combination of the above, or any other such computing device capable of implementing the various features described herein (including a virtual device such as a virtual machine). Server machine 120 can include components such as email generation engine 132, interaction tracking engine 134, transaction execution engine 136, and data repository 140. The components can be combined together or separated in further components, according to a particular implementation. It should be noted that in some implementations, various components of server machine 120 may run on separate machines (for example, data repository 140 can be a separate device). Moreover, some operations of certain of the components are described in more detail below. It should be understood that, in certain implementations, server machine 120 can also include and/or incorporate various sensors and/or communications interfaces (including but not limited to those depicted in FIG. 2 and described in relation to user device 102).

Data repository 140 can be hosted by one or more storage devices, such as main memory, magnetic or optical storage based disks, tapes or hard drives, NAS, SAN, and so forth. In some implementations, data repository 140 can be a network-attached file server, while in other implementations data repository 140 can be some other type of persistent storage such as an object-oriented database, a relational database, and so forth, that may be hosted by the server machine 120 or one or more different machines coupled to the server machine 120 via the network 110, while in yet other implementations data repository 140 may be a database that is hosted by another entity and made accessible to server machine 120. Data repository 140 can store data such as may be received from user device 102 and/or processed by/in conjunction with email generation engine 132 and/or interaction tracking engine 134, such as in order to maintain a record of various interactions occurring at a user device with respect to an email generated and/or provided via the described technologies, such as is described herein. Transaction execution engine 136 can enable the execution of various transactions (e.g., secure transactions). e.g., in conjunction with the emails described/referenced herein. In certain implementations, data repository can store a secure transaction identifier/secure transaction information (e.g., payment information such as a credit card number, billing address, shipping address, etc.) that may be associated with a user of device 102 (and/or a recipient of an email described herein). As described herein, in certain implementations emails can be generated that include selectable elements that correspond to various items with respect to which a secure transaction (e.g., a purchase of the item) can be initiated. Upon receiving a selection of such selectable elements (e.g., as described herein), transaction execution engine 136 can the execution of such a secure transaction (e.g., in conjunction with the secure transaction information that may be stored in repository 140). Additionally, in certain implementations (e.g., in a scenario in which such a selectable element is selected but the secure transaction information is not stored in repository 140), transaction execution engine 136 can provide such information and/or otherwise coordinate the execution of such a transaction via transaction execution service 152 (which can be, for example, a payment processing service).

Email distribution service 150 can be a rackmount server, a router computer, a personal computer, a portable digital assistant, a mobile phone, a laptop computer, a tablet computer, a camera, a video camera, a netbook, a desktop computer, a smartphone, any combination of the above, or any other such computing device capable of implementing the various features described herein. In certain implementations, email distribution service 150 can maintain a repository of email addresses (and/or any other such identifiers) and can be configured to distribute emails 106 to such email addresses, such as may be provided by administrator device 104 (whether directly and/or in coordination with server machine 120). The distribution of such emails to a group of users can be referred to as an email campaign.

As noted above (and as described in detail herein), server machine 120 can be configured to generate the referenced emails such that each email includes various pixels, each of which corresponds to a particular interaction with an element of the email. When such interaction(s) are performed (e.g., within an email client running on user device 102, a pixel request 108 can be provided by user device 102. e.g., to server machine 120. Upon receiving such a pixel request, server machine can maintain a record of such a request (e.g., in data repository), including various related metadata (e.g., the identity of the user from whom the request was received, the time/date the request was received, etc.). In doing so, a record of the manner in which various users interacted with a particular email can be maintained, as described herein. Additionally, in certain implementations the described technologies can generate the code that makes up the emails (e.g., HTML, CSS, etc., as described herein), and the code can be provided to another service (which can disseminate the email(s)).

It should be understood that though FIG. 1 depicts server machine 120, devices 102 and 104, and service 150 as being discrete components, in various implementations any number of such components (and/or elements/functions thereof) can be combined, such as within a single component/system. For example, in certain implementations devices 102 and/or 104 can incorporate features of server machine 120. In another example, server machine 120 and service 150 can be combined into a single machine.

As described in detail herein, various technologies are disclosed that enable generating interactive emails and tracking user interactions. In certain implementations, such technologies can encompass operations performed by and/or in conjunction with email generation engine 132 and/or interaction tracking engine 134.

Figure 4A:
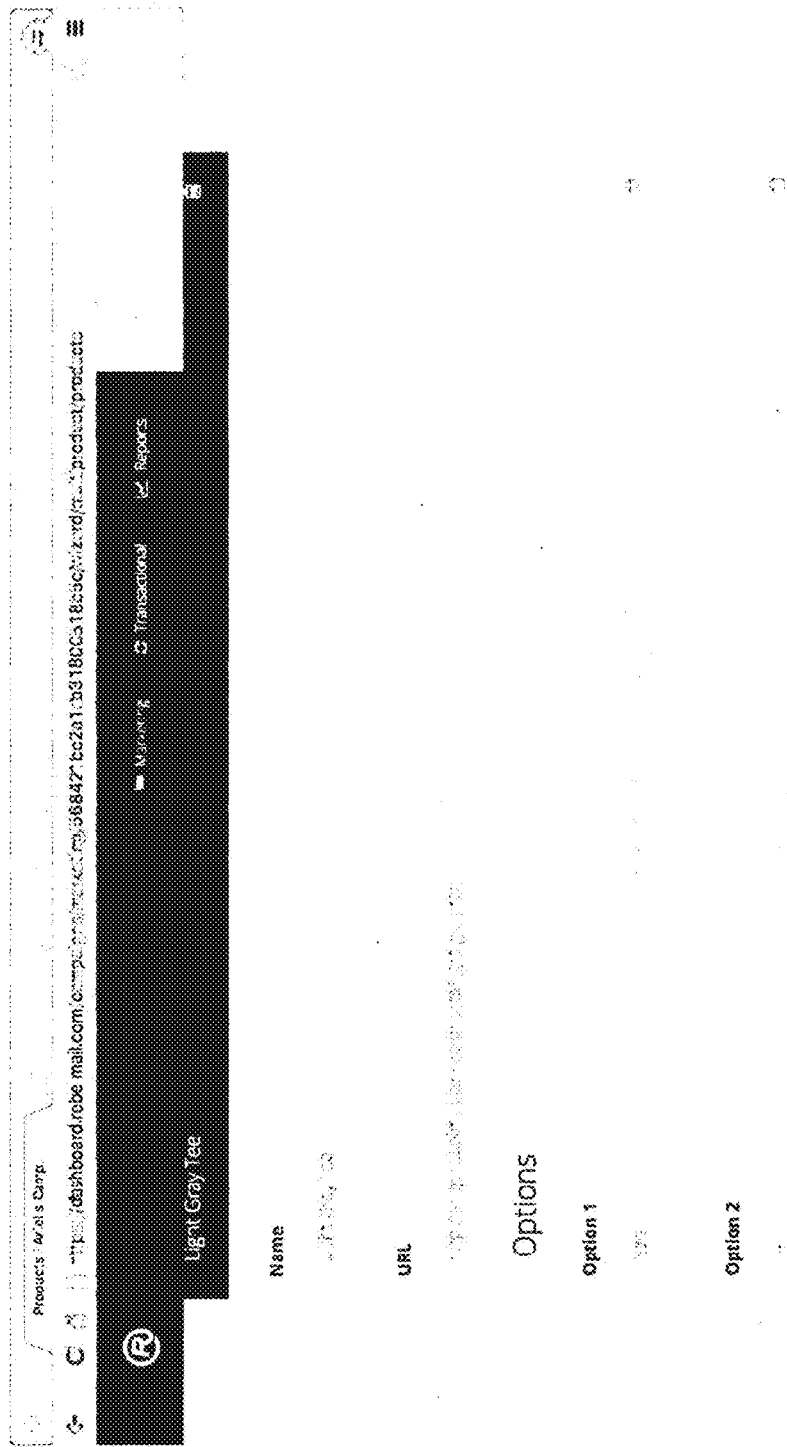
FIGS. 4A-4C illustrate example scenarios described herein, according to various example embodiments.

By way of illustration, FIG. 4A depicts an exemplary user interface, such as an interface through which administrator device 104 (e.g., an individual or entity wishing to promote a product, service, etc., and/or to otherwise disseminate content via an email campaign) can define various parameters and/or otherwise configure email generation engine 132 to generate emails that incorporate various interactive elements. As described herein, interaction tracking engine 134 can be configured to track the various interactions of a particular user and/or a set of users with respect to such email(s) based on pixel requests received from an email client executing on a user device (e.g., pixel requests that correspond to particular interactions with interactive elements of the email, as described herein).

As shown in FIG. 4A, administrator device 104 can define various parameters such as options and/or variants. By way of illustration, with respect to apparel, such options can include a size (e.g., small, medium, etc.), a fit (e.g., slim, standard, etc.), etc. By way of further illustration, such variants can correspond to combinations of various options (e.g., small-slim, large-standard, etc.). It should be understood that each option and/or variant can be associated with its own respective pixel (each of which can be embedded within the email). Accordingly, upon receiving a selection of a particular option, variant, etc., (e.g., within the email client executing on user device 102), the corresponding pixel associated with such an option/variant can be requested, and this interaction can be logged by interaction tracking engine 134.

Figure 4B:
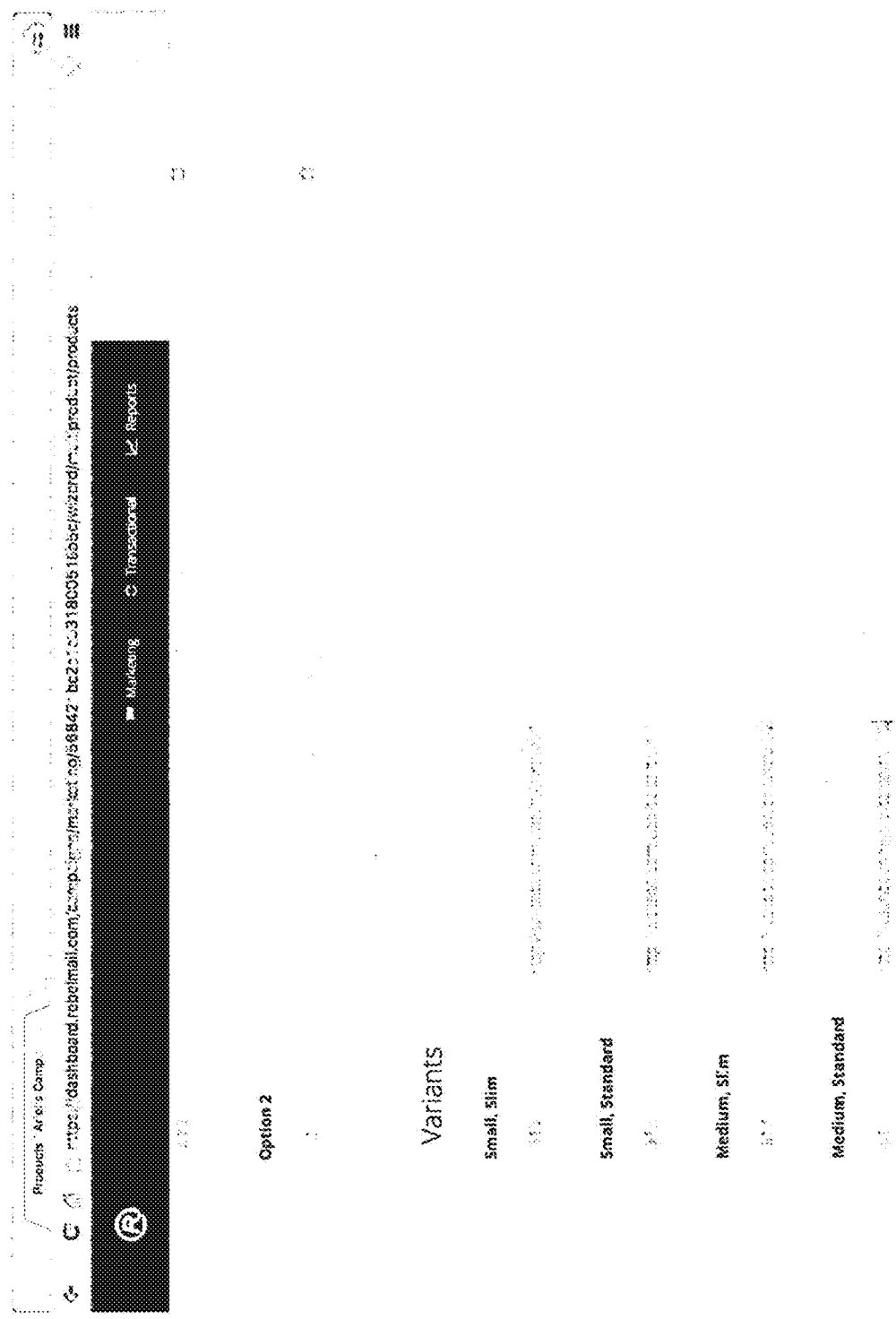

By way of further illustration, FIG. 4B depicts an exemplary user interface, such as an interface through which administrator device 104 can define additional parameters and/or aspects of the referenced variants. For example, as shown, the referenced interface can enable the administrator device to define pricing for each respective variant, as well as to define a particular URL with respect to which further interactions associated with such an item should be directed (e.g., to a 'check out' page, etc.).

Figure 4C:
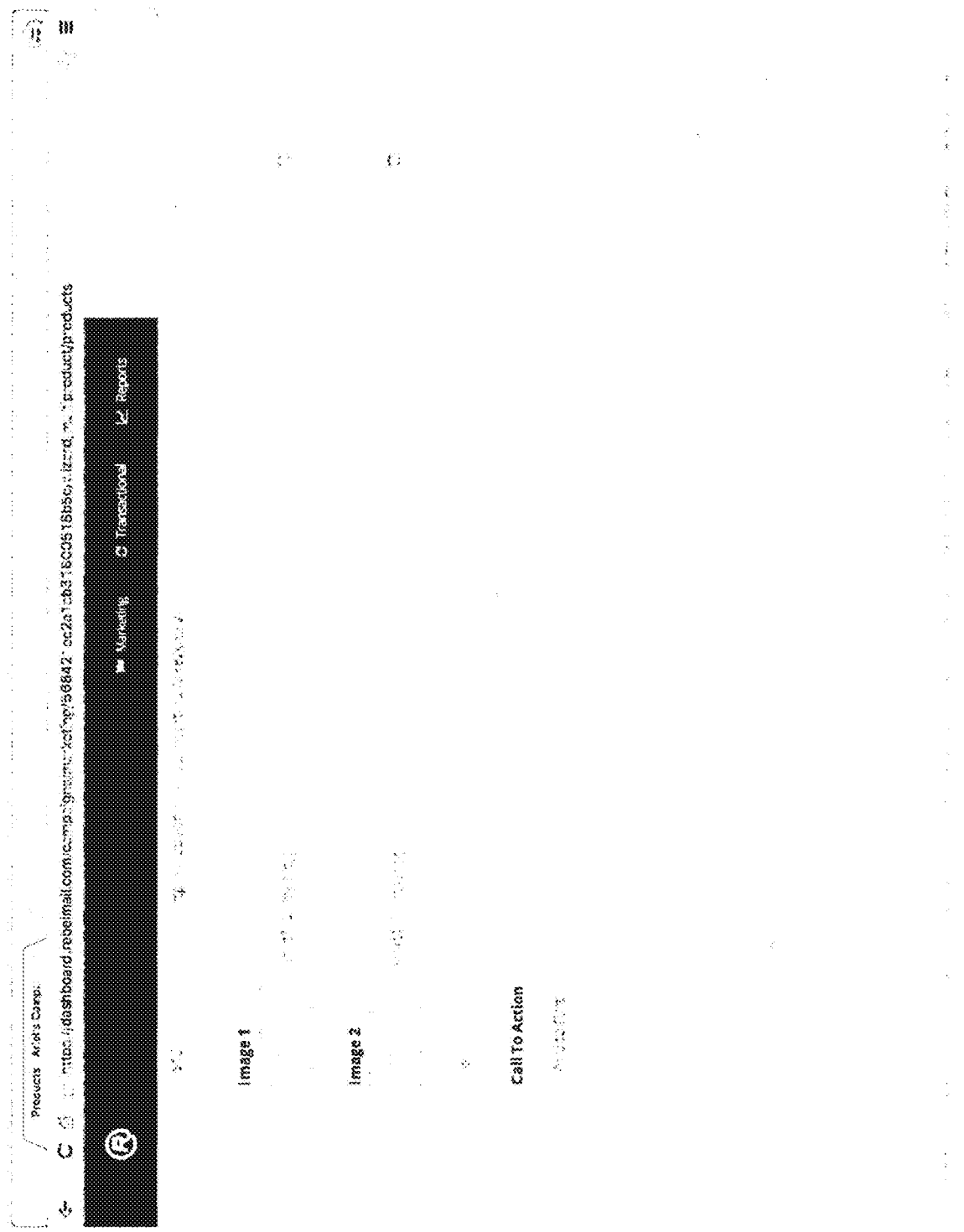

FIG. 4C depicts a further exemplary user interface, such as an interface through which administrator device 104 can define additional parameters and/or aspects of the referenced email campaign. For example, as shown, the referenced interface can enable the administrator device to identify graphical content (e.g., embedded images) to include within the email.

In certain implementations, such an administrator can define or create an email/email campaign via various templates. Such emails/campaigns can further incorporate or utilize various application programming interfaces (APIs) (e.g., in a scenario in which transaction functionality is incorporated into the email. The emails can then be sent/delivered, and various interactions can be received, logged, analyzed, etc., as described herein.

Figure 5A:
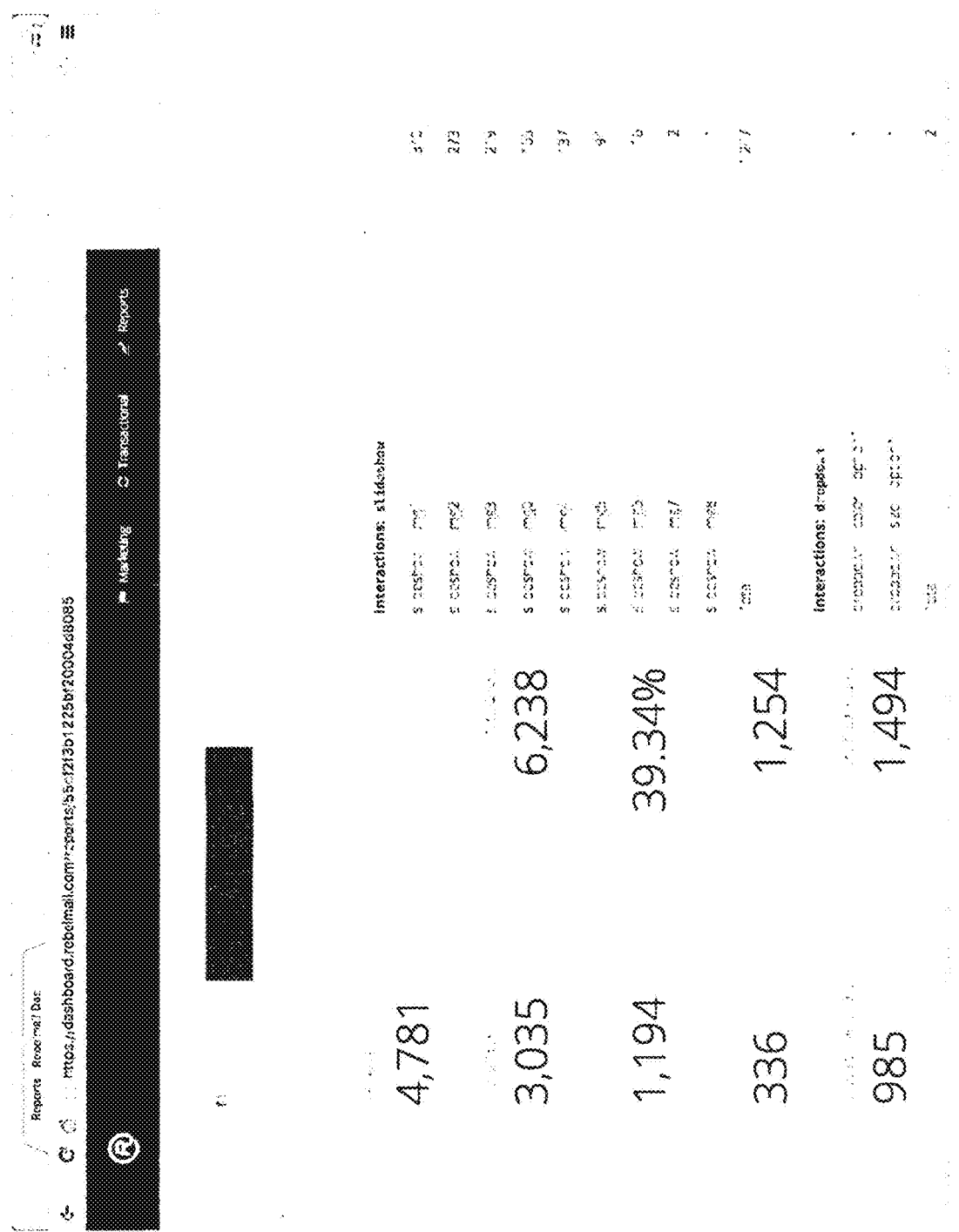
FIGS. 5A-5B illustrate example scenarios described herein, according to various example embodiments.

Figure SA depicts an exemplary user interface, such as an interface through which administrator device 104 can interact with interaction tracking engine 134 in order to monitor, review, analyze, etc., the results associated with email campaign(s). For example, as shown in Figure SA, various metrics can be presented, such as the number of emails opened, the quantity of interactions that occurred with respect to such emails, as well as further details regarding the nature of such interactions. For example, as shown, the number of interactions, clickthroughs, unique interactions, etc., can be computed and presented. Additionally, various aspects of the referenced interactions can be shown, such as with respect to which aspects of the email (e.g., which image(s)) such interactions occurred. For example, FIG. 5A depicts the number of times various images in a slideshow (as embedded within the email) were viewed, and the number of times a particular option and/or variant was selected within the email. As noted above, each of the referenced interactions can be tracked by interaction tracking engine 134 based on a pixel request received from an email client that corresponds to the particular interaction.

Figure 5B:
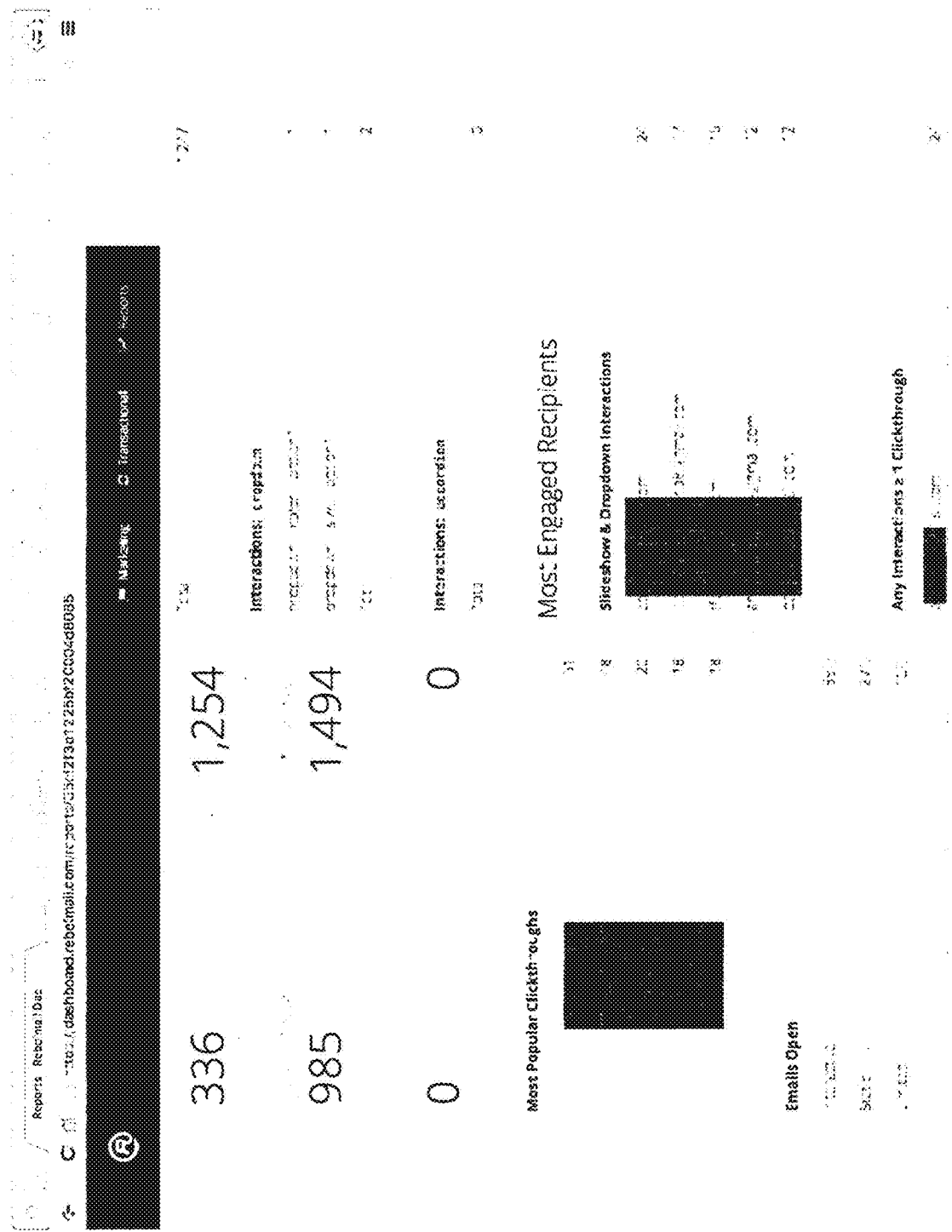

FIG. 5B depicts further aspects of the referenced interface through which administrator device 104 can interact with interaction tracking engine 134. For example, as shown in FIG. 5B, administrator device 104 can be presented with the most popular clickthroughs (e.g., those links within the email that were most commonly selected) as well as the most engaged recipients (e.g., those email recipients that performed the greatest number of interactions with the email). It should be understood that the described scenarios are exemplary and that the described technology can be implemented within and/or configured with respect to numerous other scenarios and metrics.

Figure 7:
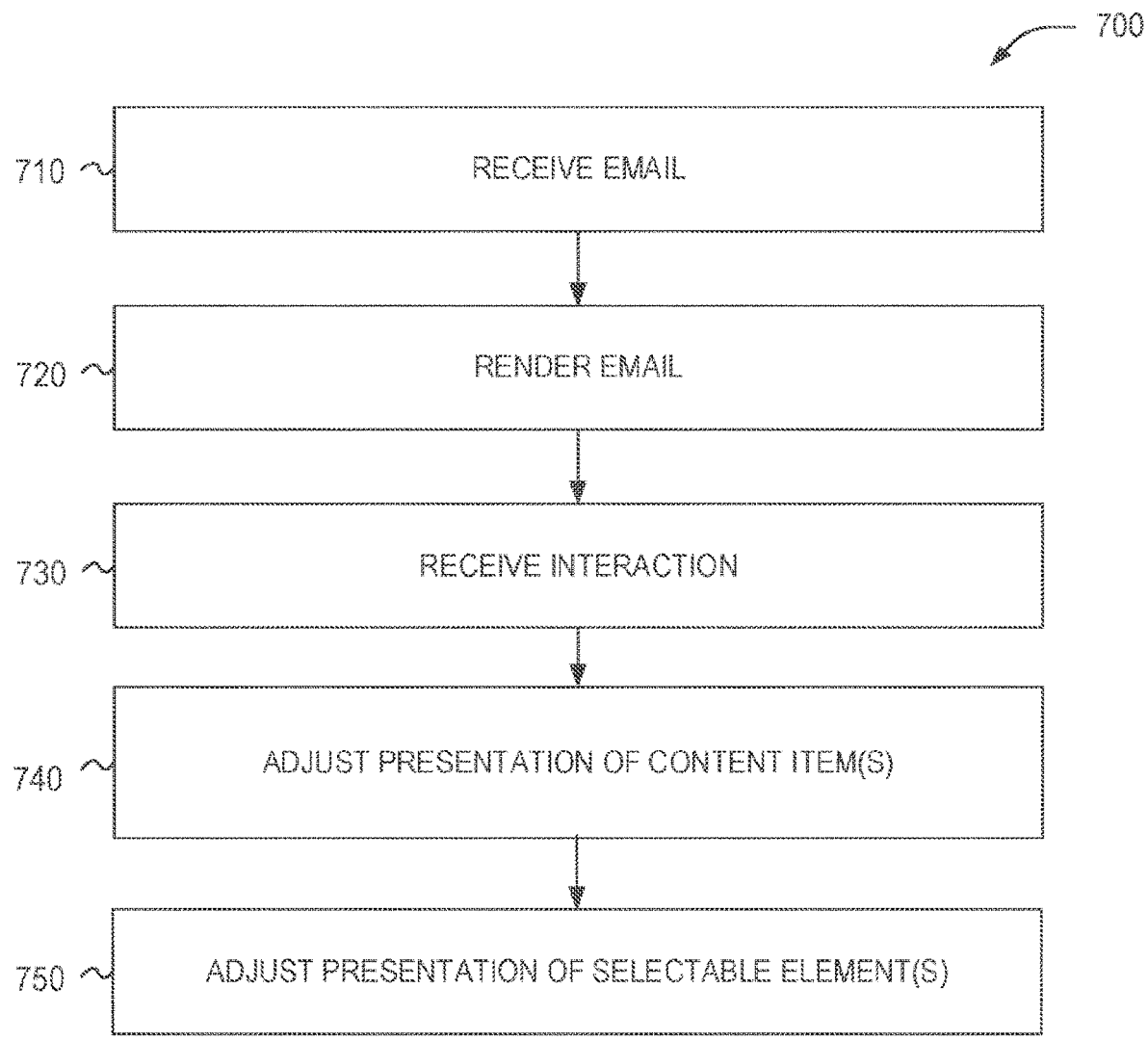
FIG. 7 is a flow chart illustrating a method, in accordance with an example embodiment described herein.

Further aspects of the manner in which an administrator can interact with interaction tracking engine 134 are also depicted in FIGS. 5 and 7. For example, in certain implementations a 'heatmap' of an email campaign can be generated, graphically depicting, for example, elements/regions of an email based on the degree to which users do/do not interact with them, the manner in which users interact with such regions/elements, etc. In doing so, subsequent emails/campaigns can be generated in a manner that replicates aspects determined to have resulted in successful interactions, while avoiding aspects determined to have resulted in successful interactions.

Figure 6A:
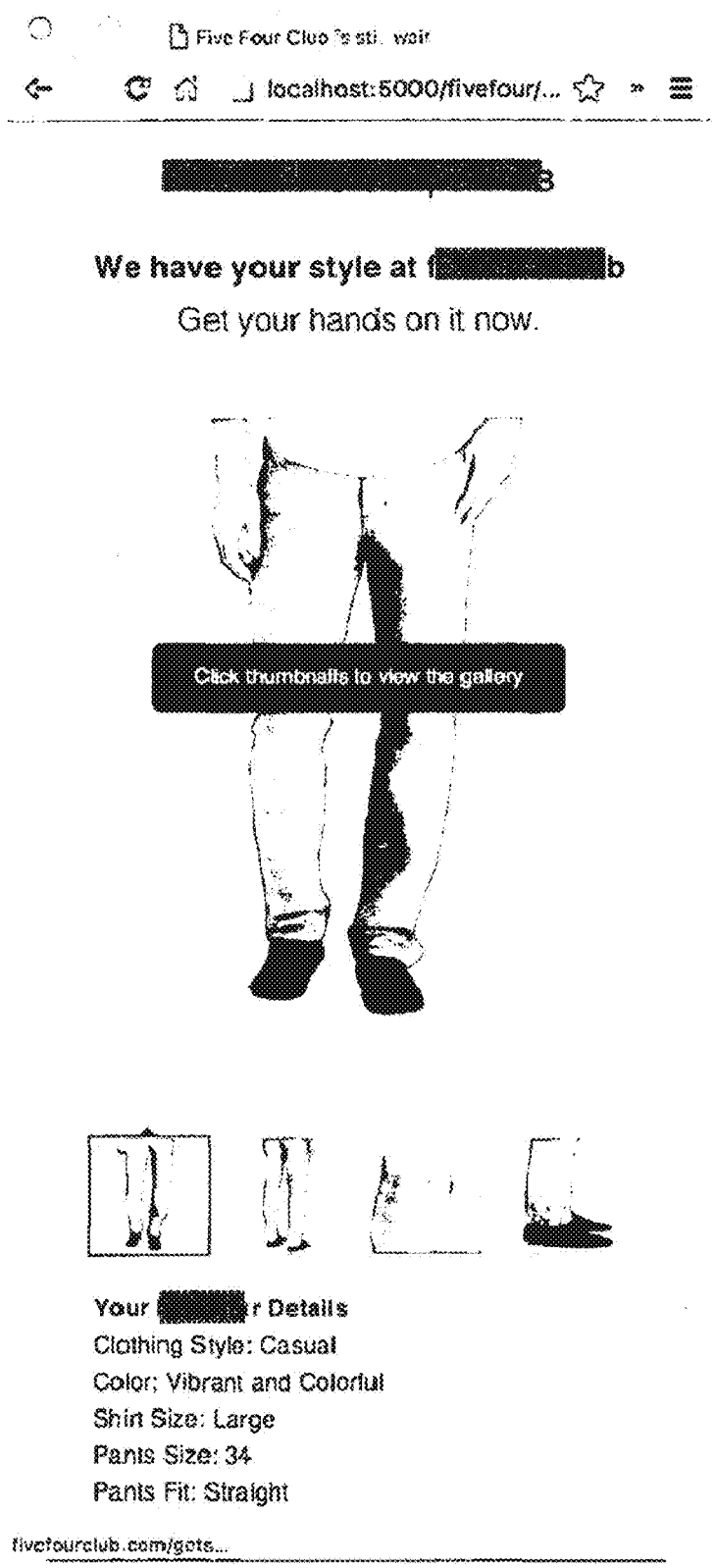
FIGS. 6A-6B illustrate example scenarios described herein, according to various example embodiments.
Figure 6B:
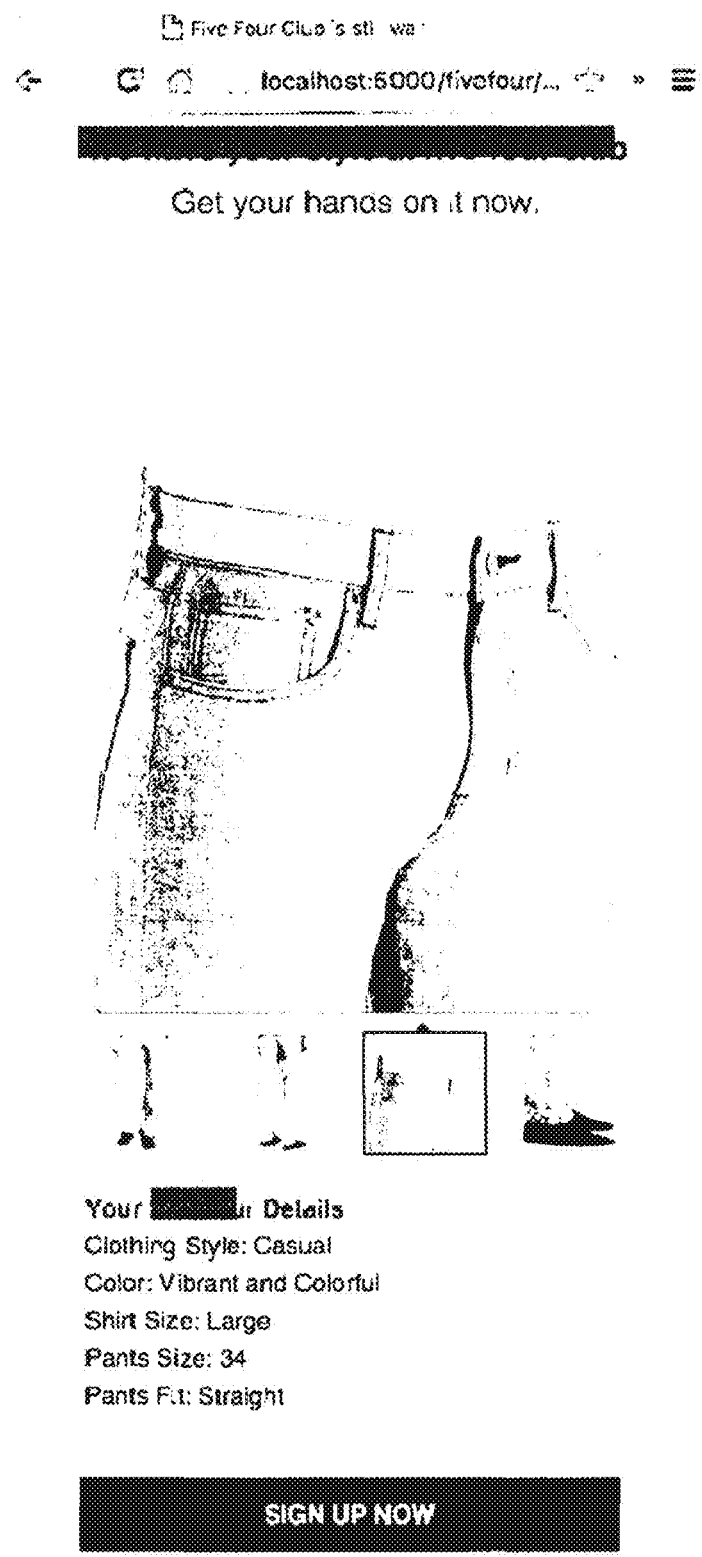

FIG. 6A depicts an exemplary email 106, such as may be defined by administrator device 104, generated by email generation engine 132, distributed by email distribution service 150, and/or received (and/or interacted with) by user device 102. As shown in FIG. 6A, an image gallery or carousel can be presented within the email (e.g. as viewed within an email client), with various thumbnail images depicting, for example, different views of a product. As shown in FIG. 6B, upon selecting one of the referenced thumbnails, the selected image can be depicted (e.g., within the primary image region of the image carousel, as shown). As noted, each of the referenced interactions (e.g., selection of a particular thumbnail) can correspond to a different pixel embedded within the email. Accordingly, upon receiving such a selection, the corresponding pixel can be requested, and such a request can be logged by interaction tracking engine 134. In doing so, the administrator, etc., can be provided with additional insight regarding the manner in which emails and/or email campaigns are being interacted with (e.g., by certain recipients, etc.). As noted, in certain implementations, user interactions with an email can be logged by interaction tracking engine 134.

It should be understood that the scenarios depicted and/or described herein are exemplary and that the described technologies can be similarly implemented with respect to other interactive elements as well. Examples of such interactive elements include but are not limited to an accordion element. For example, when the title of such an accordion element is selected, additional text can be made visible. In such a scenario, upon receiving a selection of such an element, a :focus state on the html element can change. Such a :focus state can be associated with a piece of CSS waiting for that :focus state. By way of further example, in certain implementations a :checked state can be associated with a piece of CSS waiting for that :checked state. The referenced CSS can be configured to load a background image (e.g., the referenced tracking pixel), though which the interaction can be tracked (together with a timestamp and/or other items).

It can be appreciated that the while existing email tracking technologies merely enable a user/administrator to track whether an email has been opened and/or a link within the email has been selected, the described technologies enable the logging of interactions occurring within the context of the email client itself. In doing so, administrators and other can better identify content that users are (or are not) interested in and can more effectively develop and arrange content within email campaigns to improve user engagement.

As noted, further exemplary interactions that can be tracked/logged using the described technologies include but are not limited to: whether the user interacted with photo gallery (and which photos did the user interact with and how did the user interact with them), whether the user interacted with the header image and then the footer image, whether the user made a particular selection (e.g., in a dropdown in the email), scrolling interactions, hovering interactions, and/or any other such interactions that the user may perform in relation to the email as presented within the email client on the user device.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Various aspects of the technologies described herein include one or more methods, such as those described herein. The method is performed by processing logic that may comprise hardware (circuitry, dedicated logic, etc.), software (such as is nm on a computing device such as those described herein), or a combination of both. For simplicity of explanation, methods are described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 3:
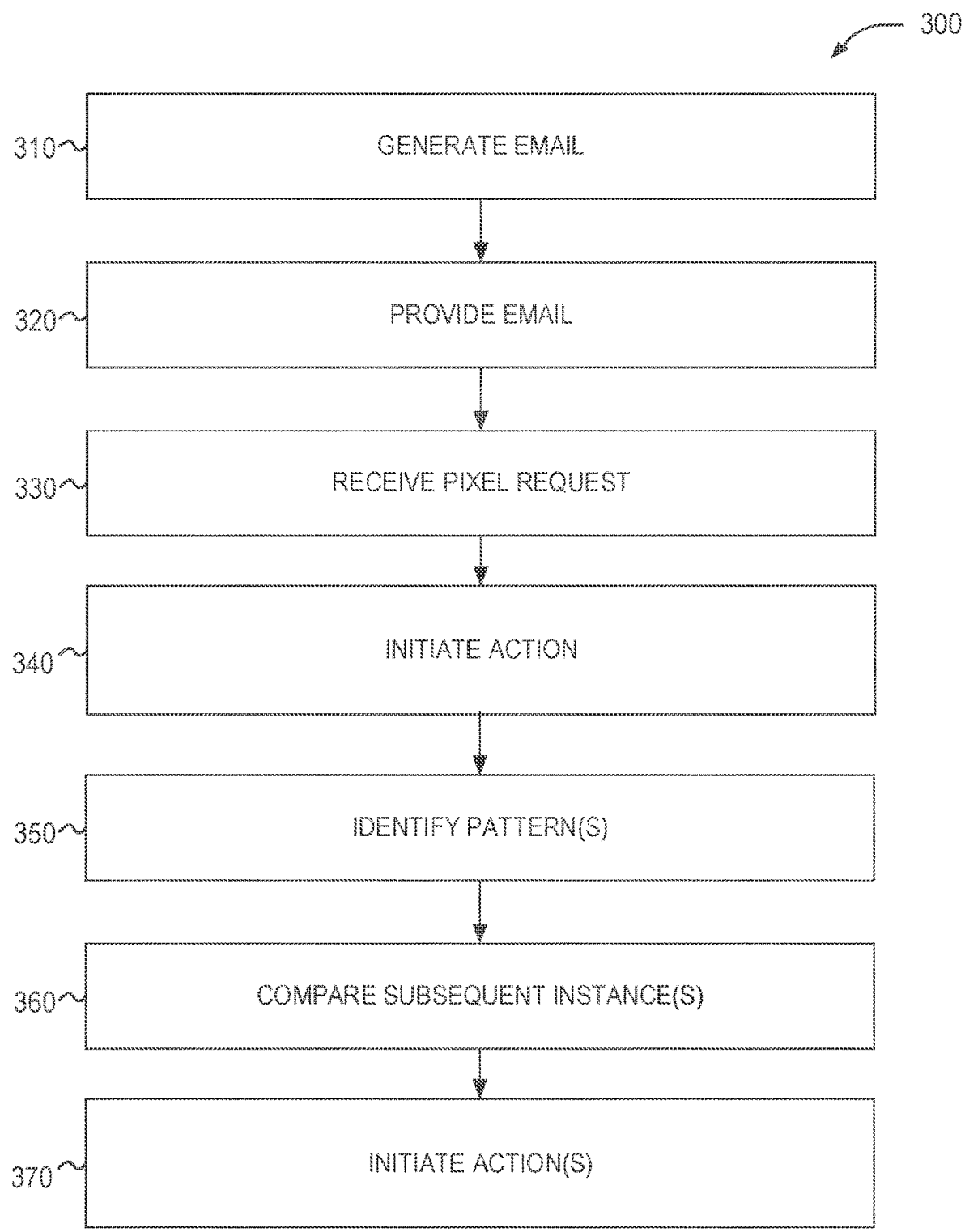
FIG. 3 is a flow chart illustrating a method, in accordance with an example embodiment described herein.

For example, FIG. 3 depicts an exemplary flow diagram showing a method of generating interactive emails and tracking user interactions, such as is described herein.

At block 310, an email can be generated, such as in a manner described herein. Such an email can include various interactive element(s) (e.g., buttons, menus, galleries, etc.), as well as various tracking pixels, each of which can correspond to a particular interaction (e.g., a particular selection of a particular interactive element), such as is described herein. It should be understood that, in certain implementations, various aspects of block 310 can be performed by email generation engine 132 and/or server machine 120, while in other implementations such aspects may be performed by one or more other elements/components, such as those described herein.

At block 320, the email (e.g., as generated at 310) can be provided or otherwise disseminated (e.g., to an email recipient). In certain implementations, various aspects of block 320 can be performed by email generation engine 132, interaction tracking engine 134, and/or server machine 120, while in other implementations such aspects may be performed by one or more other elements/components, such as those described herein. It should also be noted that, in other implementations, another service and/or machine (e.g., email distribution service 150) can be configured to distribute the referenced email.

At block 330, a pixel request can be received. In certain implementations, such a pixel request can be received from an email client (e.g., an email viewing application), such as an email client associated with a recipient to which the email (e.g., the email provided at 320) was directed. Additionally, in certain implementations such a pixel request can correspond to one or more pixels embedded within the referenced email, each of which correspond to a particular interaction with the email within the email client, as described herein. In certain implementations, various aspects of block 330 can be performed by interaction tracking engine 134 and/or server machine 120, while in other implementations such aspects may be performed by one or more other elements/components, such as those described herein.

At block 340, an action can be initiated. For example, in certain implementations an interaction instance (e.g., with the interactive element) can be logged. Such an interaction instance can be logged, for example, with respect to the email recipient. As described herein, such an interaction instance (reflecting, for example, that a particular user interacted with a particular email in a particular way at a particular time) can be logged based on the referenced pixel request (e.g., a request for a pixel that corresponds to a particular type of interaction within the referenced email). In certain implementations, various aspects of block 340 can be performed by interaction tracking engine 134 and/or server machine 120, while in other implementations such aspects may be performed by one or more other elements/components, such as those described herein.

By way of further example, the referenced action can be initiated with respect to another service (e.g., transaction execution service 152 and/or any other such third-party service). In doing so, the referenced pixel request(s) can be configured to initiate actions, etc., with respect to other services. In doing so, another service can receive a notification, instruction, etc., (e.g., via the referenced pixel(s)) in response to a user's interaction with the email within the email client (e.g., even in a scenario in which the user has not clicked a link 'out' of the email).

Moreover, in doing so, for example, real-time content can be provided within the referenced email (e.g., as presented within the email client). For example, a user can select a selectable element within an email (e.g., as described herein), and such selection can trigger a request (e.g., from another service, etc.) to provide real-time content (e.g., to load an image from a server which reflects real-time poll results or other such information). Such content can then be loaded/presented within the email client, as described herein. In doing so, real-time content can be loaded/presented within the email client (e.g., in response to a user interaction, selection, etc.).

At block 350, one or more interaction patterns can be identified. In certain implementations, such interaction pattern(s) can be associated with the email recipient. Such pattern(s) can reflect, for example, contextual information (e.g., time, location, etc., with respect to which the user does or does not frequently interacts with emails, content, content types, etc., that the user the user does or does not frequently interacts with, etc.).

At block 360, a subsequent interaction instance can be compared to the identified interaction pattern. In doing so, it can be determined whether such subsequent interaction instance(s) are (or are not) consistent with the identified interaction pattern. For example, if a user is historically identified as opening emails, interacting with them, etc., in a certain geographic location, in a scenario in which it is determined that a subsequent interaction occurred in another location (e.g., outside of a defined radius of the user's regular location), it can be determined that such interaction(s) may be fraudulent (e.g., not authorized by the user).

At block 370, an action can be initiated based on the comparison. For example, a notification can be sent (e.g., to confirm that the user's device, account, etc., has not been compromised), the user's account can be flagged or locked, etc.

FIG. 7 is a flow chart illustrating a method 700, according to an example embodiment, for content presentation and adjustment. The method is performed by processing logic that can comprise hardware (circuitry, dedicated logic, etc.), software (such as is run on a computing device such as those described herein), or a combination of both. In one implementation, the method 700 is performed by one or more elements depicted and/or described in relation to FIG. 1 and/or FIG. 2 (including but not limited to device 102), while in some other implementations, the one or more blocks of FIG. 7 can be performed by another machine or machines.

At operation 710, an email can be received. e.g., within an email client. The email can include a style sheet. The style sheet can include identifiers that define various content presentation parameters, as described herein.

At operation 720, the email can be rendered, presented, etc., e.g. within the email client executing on the device. In certain implementations, in doing so a first selectable element can be presented within the email client. Additionally, a second selectable element can be presented within the email client. Various content items can also be presented within the email client, as described herein.

At operation 730, a selection can be received, e.g., within the email client. In certain implementations, such a selection can be a selection of the first selectable element.

At operation 740, a presentation of the one or more content items can be adjusted, e.g., within the email client. In certain implementations, such an adjustment can be in response to the selection of the first selectable element. In certain implementations, the presentation of the one or more content items can be adjusted by obscuring a presentation of at least one of the one or more content items that are not associated with the first selectable element. Additionally, in certain implementations the presentation of various content items that are not associated with the first selectable element can be obscured in accordance with an identifier within a style sheet included within the email. In certain implementations, a positioning of at least one of the one or more content items that are associated with the first selectable element can be adjusted within the email client. In certain implementations, one or more content items is associated with an identifier within the style sheet.

At operation 750, a presentation of the first selectable element can be adjusted, e.g., within the email client. In certain implementations, such adjustment can be in response to the selection of the first selectable element. In certain implementations, the selection of the first selectable element adjusts the presentation of the first selectable element in accordance with a first identifier within a style sheet within the email that includes one or more identifiers that define one or more content presentation parameters.

Further aspects and examples of the operations of FIG. 7 are described below.

FIGS. 8A-8D depict an email that can be received by and rendered within an email client (e.g., a web-based email client, standalone email application, etc.). Such an email can include content in a markup language (e.g., HTML content, as shown in FIGS. 8A-8C). The email can also include a style sheet (e.g., a cascading style sheet or CSS, such as style sheet 8D10 as shown in FIG. 8D). The style sheet can describe the look, formatting, etc. of content, such as content composed in a markup language (e.g., the HTML content of FIGS. 8A-8C).

FIG. 8E depicts the referenced email as rendered or otherwise presented within an email client. As shown in FIG. 8E, various selectable elements 8E04A, 8E04B, etc., can be presented. Such selectable elements can be, for example, interactive controls such as buttons or any other such graphical element that can be interacted with.

As also shown in FIG. 8E, various content items (e.g., content items 8E06A and 8E06B, as shown) can also be included within the referenced email and presented within the email client. Such content items can include and/or incorporate various types of content such as text, graphics, media, links, etc. For example, the various content items depicted in FIG. 8E can correspond to various products (e.g., different clothing products having different colors, sizes, prices, etc.).

Upon selecting or otherwise interacting with a selectable element (e.g. selecting selectable element 8E04A, corresponding to 'Red,' as shown in FIG. 8E), the presentation of such selectable element (e.g., the button) can be adjusted. For example, the color of the button can change, thereby visually reflecting within the email client that the button has been selected.

In certain implementations, such an adjustment (e.g., changing the color of the selected button) can be effected in accordance with various identifiers (e.g., selectors within a style sheet, such as style sheet 8D10 depicted in FIG. 8D).

For each identifier, the style sheet can define various content presentation parameters (e.g., color, font, etc.) to be applied to content to winch such an identifier is associated. For example, the selection of the 'Red' button (selectable element 8E04A, as shown in FIG. 8E) activates selector 8A02 ("filterselect," here with respect to element 'filtercolorred' which corresponds to the 'Red' button) as shown in FIG. 8A. Such a selector can be defined in the referenced stylesheet (e.g., style sheet 8D10 as shown in FIG. 8D, showing class ".filter-select") which can dictate that the color of the referenced button is to change when selected. In doing so, the color of the selected button can be changed.

Additionally, in certain implementations the selection of a selectable element (e.g., one or more of the referenced buttons) can adjust the presentation of various content items as depicted in the email client. For example, as shown, the buttons can correspond to various product options that a user can select, and the various products that meet such selected options can be presented within the email client. Those products that were initially presented, but no longer meet the selected options, can be obscured/hidden from view within the email client.

For example, upon receiving a selection of selectable element 8E04A ('Red') as shown in FIG. 8E, element 'filtercolorred' (as shown in FIG. 8A) can be set to a ':checked' state (e.g., with respect to the form inputs). In doing so, the style sheet (e.g., style sheet 8D10 as shown as shown in FIG. 8D) can filter out (e.g., obscure from presentation within the email client) those content items associated with other colors (e.g., blue and green). For example, as shown in FIG. 8D, the class corresponding to 'filtercolorred' being selected (checked) can cause 'filterblue' and 'filtergreen' to be activated (which obscure content item(s) that correspond to blue/green respectively). In doing so, various options presented within an email can be filtered in accordance within options selected by a user. As a result, options that were previously presented (e.g., those corresponding to green and blue) can be obscured/hidden within the email client, while those corresponding to the selected option (here, red) can be presented (e.g., as depicted in FIG. 8F).

FIGS. 9A-9B depict an email that can be received by and rendered within an email client (e.g., a web-based email client, standalone email application, etc.). Such an email can include content in a markup language (e.g., HTML content, as shown in FIG. 9A as well as a style sheet (e.g., CSS, such as style sheet 9B10 as shown in FIG. 9B).

Figure 9C:
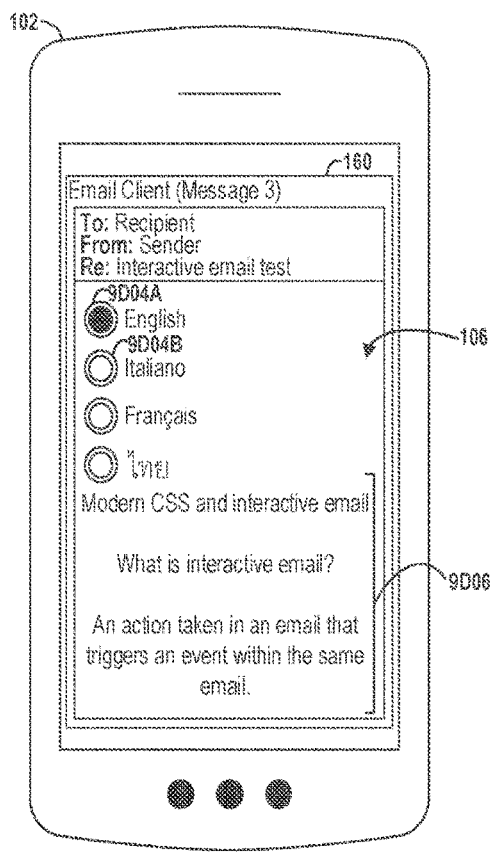

FIG. 9C depicts an example scenario on which the referenced email 106 is rendered or otherwise presented within an email client 160 executing on device 102 (here, a smartphone). As shown in FIG. 9C, various selectable elements 9D04A, 9D04B, etc., can be presented. Such selectable elements can be, for example, interactive controls such as buttons (here, radio buttons) or any other such element that can be interacted with. Such selectable elements can, for example, correspond to different languages such as English, Italian ('Italiano'), etc. As shown in FIG. 9C, in certain implementations one element (e.g., button 9D04A) can be selected by default.

As also shown in FIG. 9C, email 106 can include content/content items 9D06 that can be presented within the email client. Such content/content items 9D06 can include and/or incorporate various types of content such as text, graphics, media, links, etc. For example, the content/content items 9D06 depicted in FIG. 9C can correspond to textual content (e.g., 'Modern CSS . . . ,' as shown).

Figure 9D:
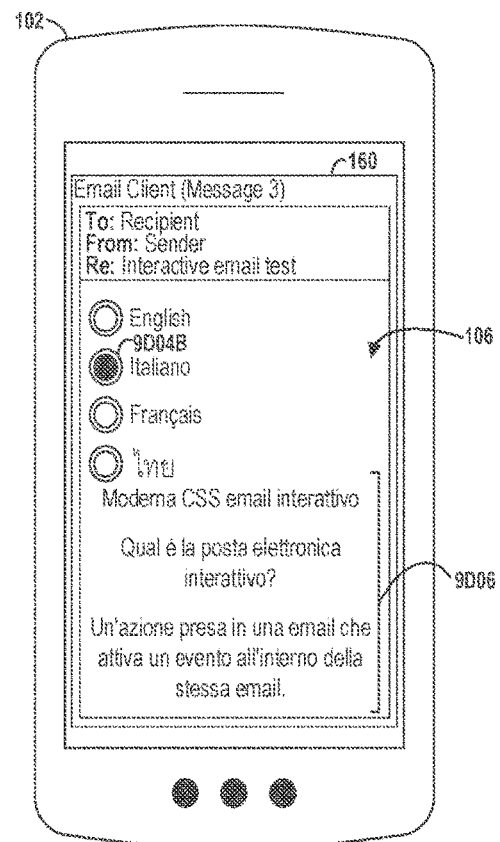

FIG. 9D depicts an example scenario in which a user interacts with email 106 (e.g., the email as depicted in FIG. 9C). For example, the user can select element 9D04B. As shown in FIG. 9D, such an interaction with element 9D04B can cause an adjustment in the presentation of content/content items as depicted in the email client. For example, as shown, the buttons can correspond to various languages that a user can select, and the text content that corresponds to a particular selected language can be presented within the email client.

By way of illustration, as shown in FIG. 9D, upon receiving a selection (e.g., at/within email client 160) of radio button 9D04B (corresponding to 'Italiano,' as shown), the presentation of content/content items 9D06 within email client 160 can be adjusted (e.g., to show the Italian translation of the content that was previously presented in English, e.g., as depicted in FIG. 9C). In doing so, the presentation of content (e.g., text) within an email client can be adjusted (e.g., in response to a selection provided by the user within the email client) such that content that is appropriate/relevant to the user (e.g., in accordance with a selection of a selectable element within the email—here, for example, corresponding to a particular language) is presented within the email client. Additionally, in certain implementations content within the email that corresponds to a selectable element that is not selected (e.g., one of the languages that has not been selected) can be obscured, hidden, or otherwise withheld from presentation within the email client, as described herein.

In certain implementations, the referenced presentation adjustments (e.g., within the email client) can be effected in accordance with various identifiers (e.g., selectors within a style sheet, such as style sheet 9B10 depicted in FIG. 9B). For example, class/identifier 9B02A (as shown in FIG. 9B) can enable an identification/determination whether a translation option/element is checked (e.g., English). The class/identifier can then set those elements with a 'lang' attribute to 'display:none,' as shown. Additionally, class/identifier 9B02B (as shown in FIG. 9B) can enable the identification/determination as to whether each selectable element/input is checked (e.g., one per language). Having identified a particular input as being checked/selected (e.g., the 'Italiano' button), those element(s) matching a specific lang attribute, (e.g, lang="it") can be identified and sets the tag(s) matching that specific attribute value can be set to 'display:inline,' as shown.

It should be understood that, as depicted in FIGS. 9A and 9B and described herein, a CSS selector (here. '~*') in combination with a 'lang' attribute (e.g., on each different piece of content) can enable display of translated email content within an email client. Additionally, the content (e.g., text) being presented to the user within the email client can be adjusted in response to a selection by the user.

It should also be noted that, in certain implementations, the referenced adjustment(s) (e.g., to content as presented within an email client) can be initiated, effected, etc., based on other information, data, inputs, etc. (e.g., in addition to and/or in lieu of a selection of a selectable element, e.g., as described herein). For example, in certain implementations various contextual information (e.g., location data) can be perceptible to and/or received by the email client (e.g., based on inputs received from various sensor(s) of the device such as a GPS receiver, based on a geographic location as determined in relation to an IP address of the device, etc.). Accordingly the described technologies can also be configured to utilize such contextual information (e.g., location) in order to adjust the presentation of an email within an email client. For example, upon determining that device 102 is located in Italy, the content adjustment(s) that correspond to Italian (as described above) can be made within the email client.

By way of further illustration, an IP address (e.g., of the device 102) can be transmitted/provided (e.g., to server 120), such as in conjunction with a request for the email (and/or content included therein) by the email client. Server 120 can use the received IP address to identify/determine the geographic location of the device 102. In response, content (e.g., CSS) can be generated (e.g., at server 120) and/or transmitted to the device. Such content can change, adjust, etc. the content of the email. e.g., with respect to the identified location.

Figure 10:
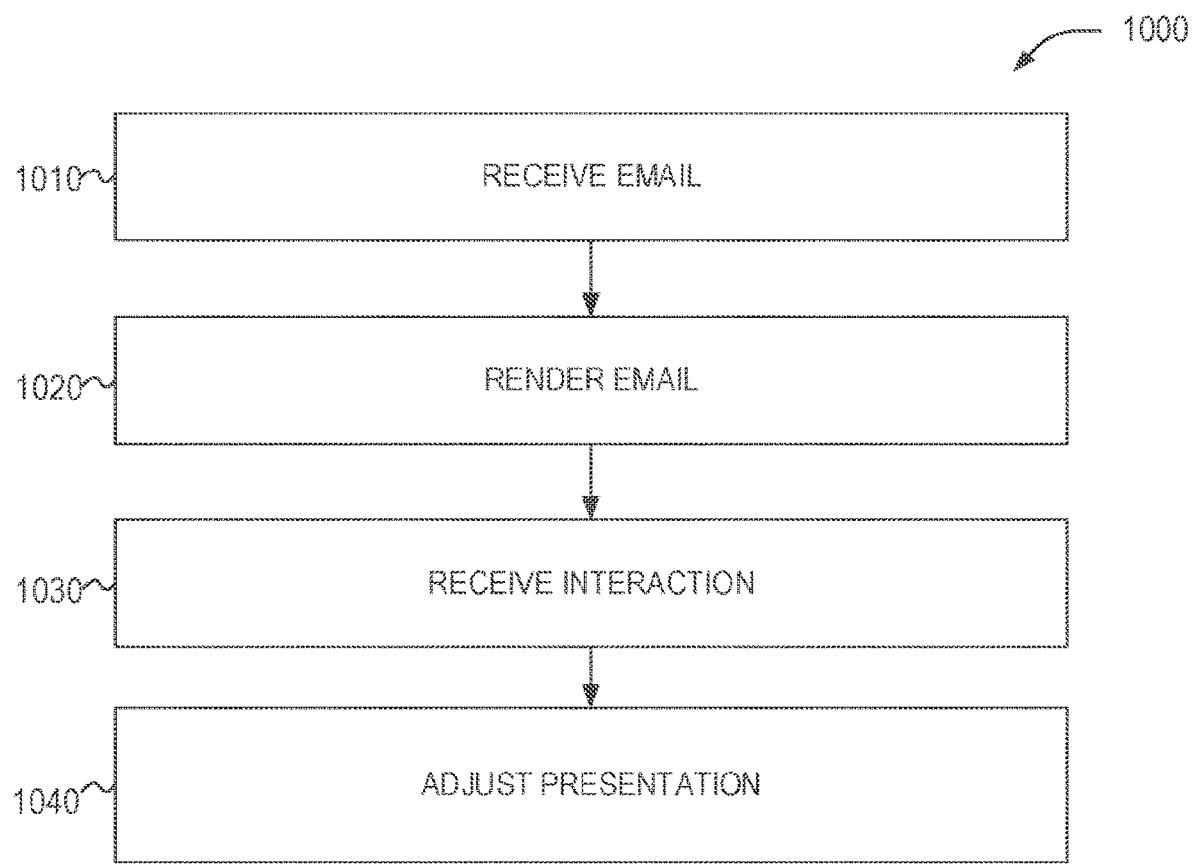
FIG. 10 is a flow chart illustrating a method, in accordance with an example embodiment described herein.

FIG. 10 is a flow chart illustrating a method 1000, according to an example embodiment, for content presentation and adjustment. The method is performed by processing logic that can comprise hardware (circuitry, dedicated logic, etc.), software (such as is run on a computing device such as those described herein), or a combination of both. In one implementation, the method 1000 is performed by one or more elements depicted and/or described in relation to FIG. 1 and/or FIG. 2 (including but not limited to device 102), while in some other implementations, the one or more blocks of FIG. 10 can be performed by another machine or machines.

At operation 1010, an email can be received, e.g., within an email client. The email can include a style sheet. The style sheet can include identifiers that define various content presentation parameters, as described herein.

At operation 1020, the email can be rendered, e.g., within the email client. In doing so, a first selectable element and/or a second selectable element presenting can be presented within the email client. In certain implementations, the second selectable element can be nested with respect to the first selectable element. Moreover, in certain implementations the second selectable element can be nested with respect to the first selectable element such that an adjustment to a presentation of the first selectable element is imposed upon the second selectable element, as described in detail herein.

At operation 1030, an interaction can be received within the email client, e.g., an interaction with the first selectable element. In certain implementations, the interaction with the first selectable element can adjust the presentation of the second selectable element in accordance with a first identifier within a style sheet within the email. In certain implementations, the interaction can include a hover operation performed in relation to the first selectable element. In certain implementations, the interaction can include a selection of the list selectable element, as described herein.

At operation 1040, a presentation of the second selectable element within the email client can be adjusted, e.g., in response to the interaction with the first selectable element. In certain implementations, the presentation of the second selectable element can be adjusted in accordance with the style sheet and a label corresponding to the second selectable element that is nested with respect to the first selectable element, as described herein.

Further aspects and examples of the operations of FIG. 10 are described below.

FIGS. 11A-11B depict an email that can be received by and rendered within an email client (e.g., a web-based email client, standalone email application, etc.). Such an email can include content in a markup language (e.g., HTML content, as shown in FIG. 11A as well as a style sheet (e.g., CSS, such as style sheet 11B10 as shown in FIG. 11B).

Figure 11C:
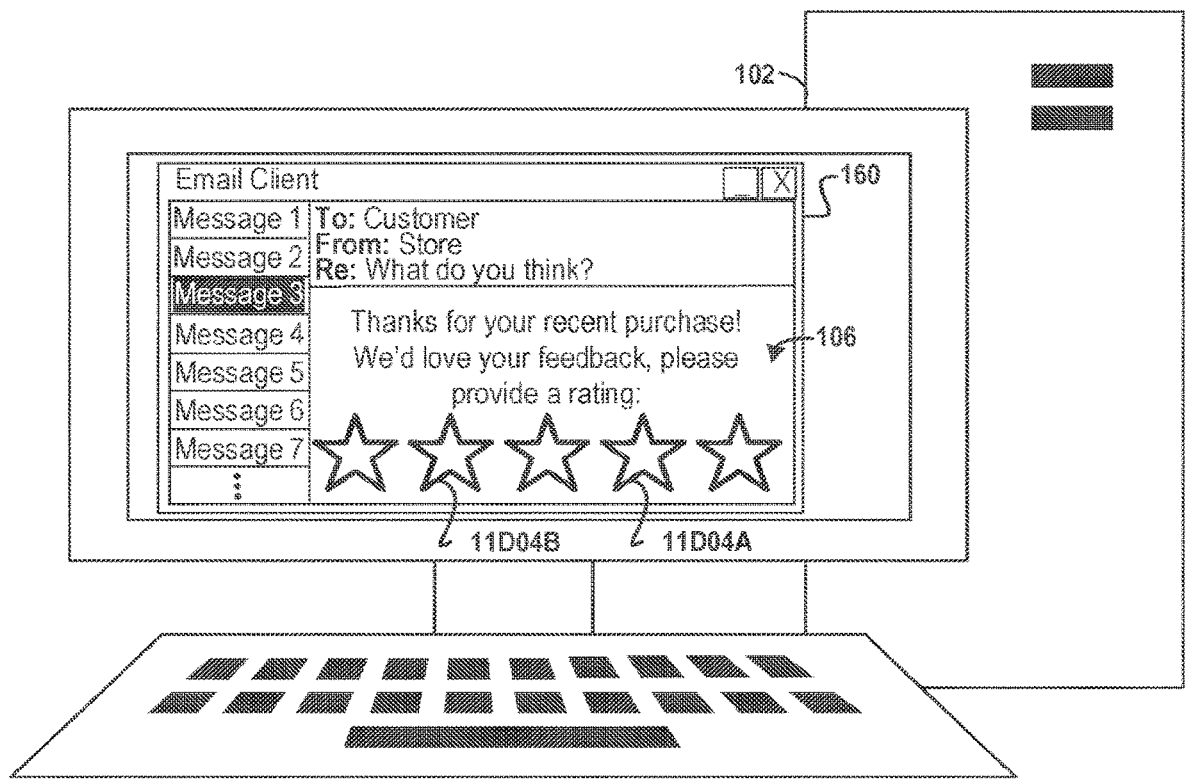

FIG. 11C depicts an example scenario on which the referenced email 106 is rendered or otherwise presented within an email client 160 executing on device 102 (here, a personal computer or 'PC'). As shown in FIG. 11C, various selectable elements 11D04A, 11D04B, etc., can be presented. Such selectable elements can be, for example, interactive controls such as buttons (here, star-shaped icons, buttons, graphics, etc.) or any other such graphical element that can be interacted with.

Figure 11D:
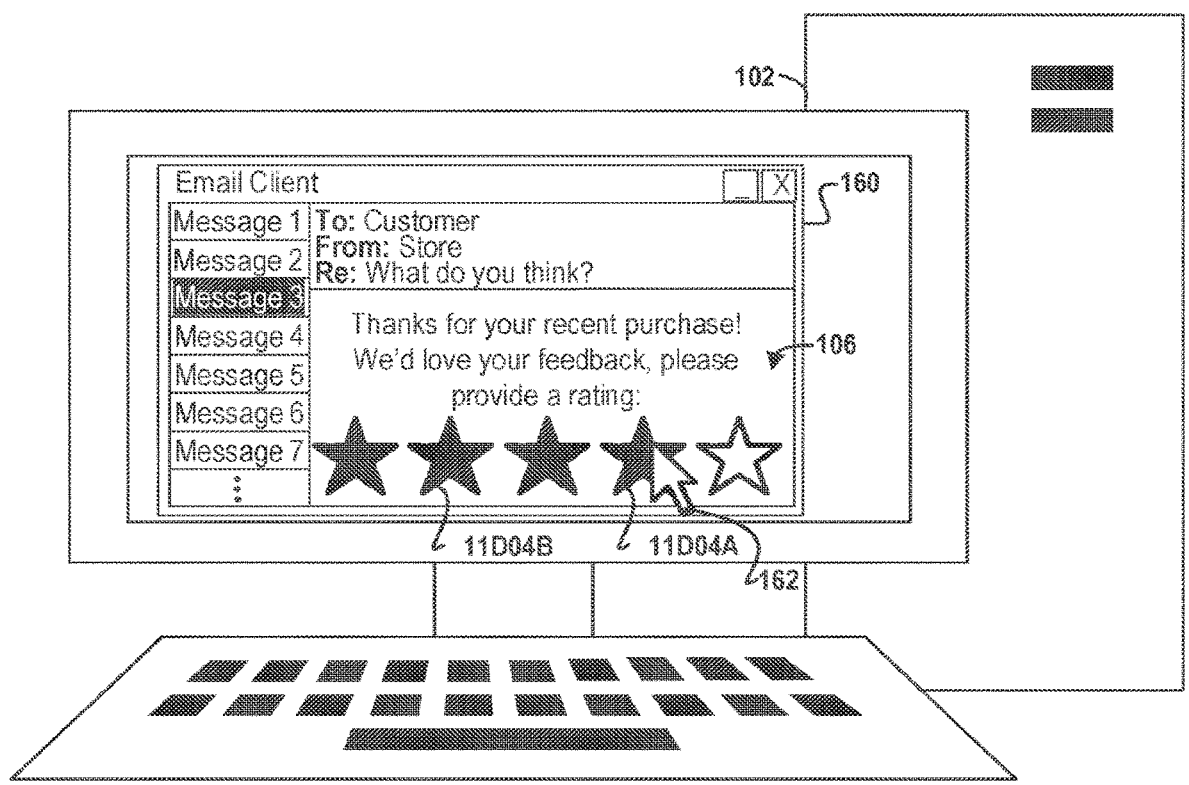

FIG. 11D depicts an example scenario in which a user interacts with email 106 (e.g., the email as depicted in FIG. 11C). For example, the user can hover a pointer 162 (e.g., a mouse pointer) over element 11D04A. As shown in FIG. 11D, such an interaction with element 11D04A can cause an adjustment in the presentation of the element itself. For example, hovering over element 11D04A can cause the element to change color (thereby visually indicating to the user that the element is being hovered over or otherwise interacted with).

Additionally, in certain implementations, the referenced interaction (e.g., hovering) with respect to one selectable element (e.g., element 11D04A) can cause various adjustment(s) to other selectable element(s). For example, as shown in FIG. 11D, hovering over element 11D04A can cause an adjustment (e.g., a change in color) to element 11D04B (as well as the various other selectable elements, such as the elements presented to the left of element 11D04A). In doing so, an interaction with one element (e.g., the fourth star in a sequence) can cause adjustments to the manner in which other element(s) (e.g., the first three starts in the sequence) are presented. Such adjustments can provide additional clarity to the presentation of content within the email client and the results and ramifications of various user interactions with such content.

In certain implementations, the referenced presentation adjustments (e.g., within the email client) can be effected in accordance with various identifiers (e.g., selectors within a style sheet, such as style sheet 11B10 depicted in FIG. 11B). For example, selector/identifier 11B02A ('.ratingIcon:hover') as shown in FIG. 11B can define or dictate the color that a selectable element (e.g., a star) is to be depicted as when hovered over (e.g., by a mouse pointer).

Additionally, in certain implementations another selector/identifier 11B02B ('.ratingContainer label:hover label:not(:hover).rntingIcon') can enable the identification (e.g., within the parent container '.ratingContainer') of the label that is being hovered over (e.g., the label within FIG. 11A having a value of '4.' corresponding to the element 11D04A being hovered over in FIG. 11D). Having identified the label being hovered over, those label(s) that are children of the identified (e.g., hovered-over) label and that are not being hovered over (label:not(:hover)) can also be identified (here, labels '3,' '2,' and '1') and the section(s) ('div's) of the HTML content that correspond to such labels (here, '3,' '2,' and '1') can be selected.

By nesting the referenced labels (e.g., in the manner shown in FIG. 11A), an interaction (e.g., hovering) with one label (e.g., the fourth label, as shown in FIG. 11D), the style sheet 11B10 further imposes the adjustment (e.g., color change) to the various elements that correspond to labels that are children of the interacted with element (e.g., the hovered-over fourth star as shown in FIG. 11D). In doing so, an interaction with one selectable/interactive element can cause adjustments, changes, etc., to the manner in which other selectable elements are presented within the email client.

It should also be noted that the interaction(s) referenced above (e.g., hovering) are exemplary and that other interactions (E.g., selecting, clicking, etc.) can also be used. For example, selector/identifier 11B02C ('.ratingContainer label:not(:hover) input:checked+span div') can enable similar or related adjustments (as described above) with respect to a ':checked' state (e.g., as opposed to a ':hover' state of the label). Such a checked state can, for example, commit and/or make permanent a selection of an interactive element (e.g., by permanently filling in the color of the star(s)).

Figure 12:
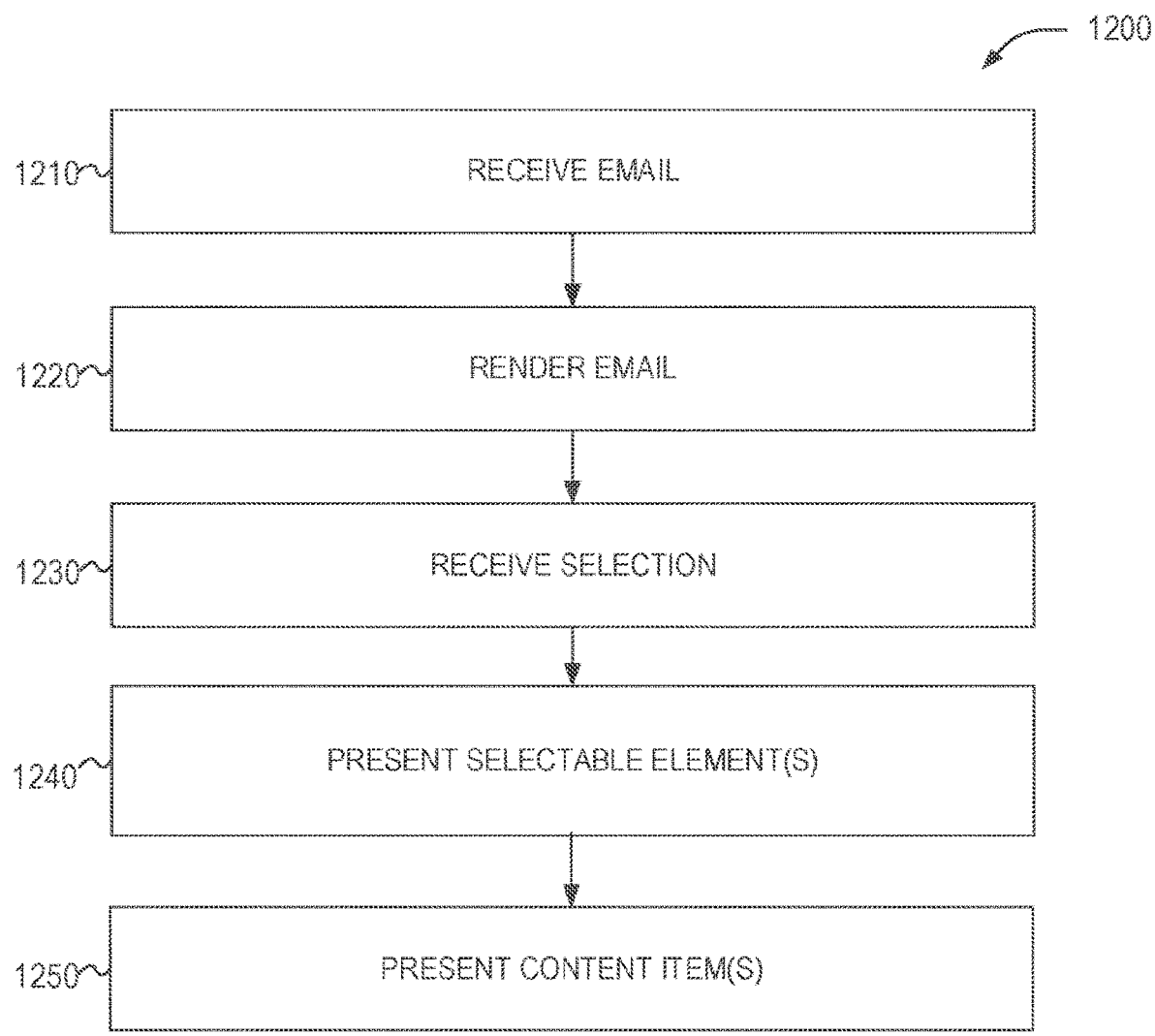
FIG. 12 is a flow chart illustrating a method, in accordance with an example embodiment described herein.

FIG. 12 is a flow chart illustrating a method 1200, according to an example embodiment, for content presentation and adjustment. The method is performed by processing logic that can comprise hardware (circuitry, dedicated logic, etc.), software (such as is run on a computing device such as those described herein), or a combination of both. In one implementation, the method 1200 is performed by one or more elements depicted and/or described in relation to FIG. 1 and/or FIG. 2 (including but not limited to device 102), while in some other implementations, the one or more blocks of FIG. 12 can be performed by another machine or machines.

At operation 1210, an email can be received, e.g., within an email client. The email can include a style sheet. The style sheet can include identifiers that define various content presentation parameters, as described herein.

At operation 1220, the email can be rendered, presented, etc., e.g. within the email client executing on the device. In certain implementations, in doing so one or more first selectable elements can be presented within the email client. Additionally, in certain implementations a first content item can be presented within the email client.

At operation 1230, a selection (or other such interaction) can be received. e.g., within the email client. In certain implementations, such a selection can be a selection of at least one of the first selectable elements.

At operation 1240, one or more second selectable elements can be presented, e.g., within the email client. In certain implementations, such elements can be presented in response to the selection of the at least one of the first selectable elements.

At operation 1250, a second content item can be presented within the email client. In certain implementations, such a content item can be presented in response to the selection of the at least one of the first selectable elements.

Further aspects and examples of the operations of FIG. 12 are described below.

Figure 13:
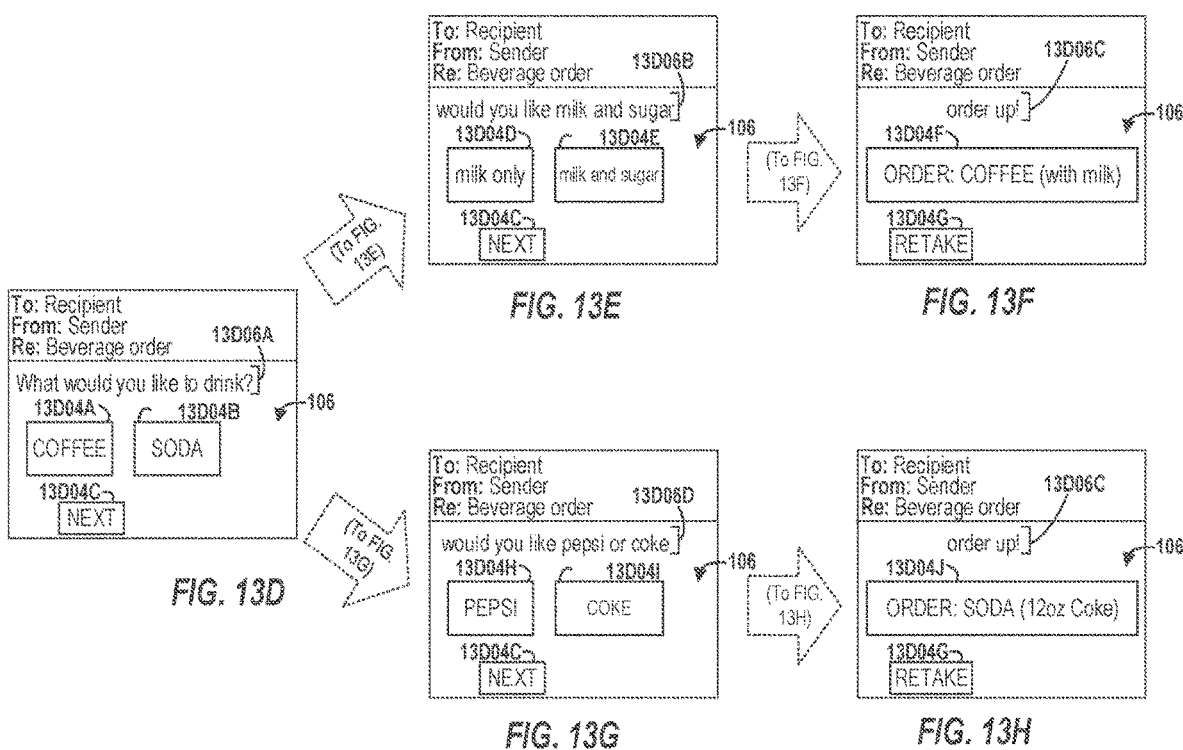
FIGS. 13A-13H illustrate various example elements and example scenarios described herein, according to various example embodiments.

FIGS. 13A-13C depict an email that can be received by and rendered within an email client (e.g., a web-based email client, standalone email application, etc.). Such an email can include content in a markup language (e.g., HTML content, as shown in FIGS. 13A-13B as well as a style sheet (e.g., CSS, such as style sheet 13C10 as shown in FIG. 13C).

FIG. 13D depicts an example scenario in which the referenced email 106 is rendered or otherwise presented within an email client (e.g., an email client executing on a device 102, as described herein). As shown in FIG. 13D, various selectable elements 13D04A, 13D04B, etc., can be presented. Such selectable elements can be, for example, interactive controls such as buttons or any other such element that can be interacted with. Such selectable elements can, for example, correspond to different options (e.g., 'COFFEE' and 'SODA,' as shown).

Email 106 can include content/content items that can be presented within the email client. Such content/content items can include and/or incorporate various types of content such as text, graphics, media, links, etc. For example, content 13D06A as shown in FIG. 13D can correspond to textual content (e.g., 'What would . . . ,' as shown).

Upon selecting one of the selectable elements (e.g., 13D04A, 13D04B, as shown in FIG. 13D) (and, in certain implementations, upon confirming/entering such selection, e.g., via the 'NEXT' button), the presentation of email 106 within the email client can be adjusted in various ways. For example, upon receiving a selection of selectable element 13D04A, the presentation of email 106 can be adjusted in the manner depicted in FIG. 13E. As shown in FIG. 13E, those selectable elements that were presented within the email client in FIG. 13D (e.g., 13D04A, 13D04B) are now obscured, hidden, etc. from presentation. Additionally, other selectable elements 13D04D, 13D04E (corresponding to 'milk only' and 'milk and sugar,' respectively) can be presented. Moreover, content 13D06A as shown in FIG. 13D can also be obscured, hidden, etc. from presentation and content 13D06B ('would you like . . . ') can be presented. Comparable adjustments, changes, etc. to the presentation of email 106 can also be effected within the email client in response to various other selections, as depicted in FIGS. 13F-13H. In doing so, a sequence of questions, prompts, etc., can be presented to the user within the email client, and the presentation of subsequent prompts, questions, etc., within the sequence can change based on a selection received at the email client. Thus, as shown in the depicted example, based on a first selection by a user (e.g., with respect to a particular type of beverage), subsequent prompts/questions that pertain to such a selection can be presented (while other prompts, questions, etc. that are not related to such a selection can be obscured, hidden, etc.). In doing so, a user can navigate through and/or provide input regarding content that is relevant to previous inputs provided by the user.

In certain implementations, the referenced presentation adjustments (e.g., within the email client) can be effected in accordance with various identifiers (e.g., selectors within a style sheet, such as style sheet 13C10 depicted in FIG. 13C). For example, as shown in FIGS. 13A and 13B (depicting the HTML content of the email 106), each of the referenced selectable elements can be associated with a 'name' and an 'id.' Additionally, each question can be marked with a class ('.q1') and can contain the labels attached to the inputs above. Additionally, various labels can represent or correspond to different states of the buttons. (for="inact-q1" class="q1-a1-def").

In certain implementations, the referenced selectable elements (e.g. the buttons) can each serve a specific purpose. The first button can be the default button and can prevent the user from moving forward in the sequence without selecting an answer. The second and third buttons may only appear after a user selects an answer. Additionally, in certain implementations only one can appear at a time (as determined based on which answer is chosen). This is the button that when checked moves the recipient onto the next question (e.g., the 'NEXT' button, as shown).

For the depicted sequence which has 2 steps and two answers/options per step, there may actually be three questions within the HTML content of the email 106 (e.g., as depicted in FIGS. 13A-13B. The first one ('.q1') can be displayed to all users, e.g., upon loading/rendering the email within the email client. The second ('.q2') and third ('.q3') may only be displayed based on which selectable element is selected (e.g., in '.q1'). Additionally, a completion slide (class 'fin') can be included within the email 106. This contains a 'span' for each of the available answers, as shown. As described, their display will change based on the choices made m each answer.

With respect to style sheet 13C10 as shown in FIG. 13C, various identifiers, selectors, etc., can enable various adjustments to the presentation of the email within the email client (e.g., in response to certain selections, as described herein). For example, '#q3-nxt:checked~.q3' within style sheet 13C10 can dictate/define that when the 'next' button is chosen, to go to '.q3' find the '.q3' element and set it to show within the email client. By way of further example, '#q1-a1:checked~*q1-a1-btn' can function in a comparable/similar manner while using selector '~*' which identifies an element that is it's sibling (within the HTML as shown in FIGS. 13A-13B in which inputs are siblings to other inputs in view of the document structure). Then '~*.q1-a1-btn' can enable identification of the elements that match that class that are children of any of its siblings. Using the referenced operations, the appropriate/relevant selectable elements and/or content can be shown within the email client, while the selectable elements/content that are not relevant (e.g., in view of a previous selection) can be obscured, hidden, or otherwise not displayed within the email client.

Figure 14:
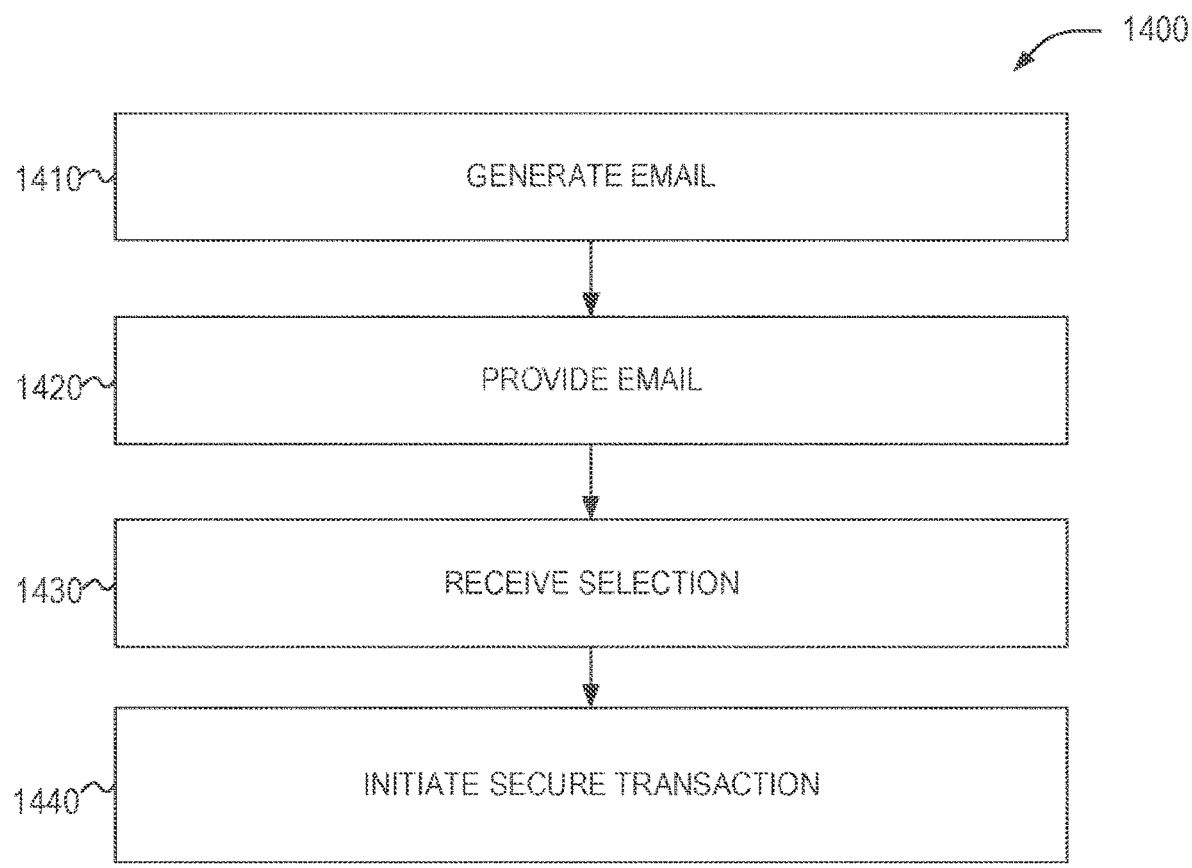
FIG. 14 is a flow chart illustrating a method, in accordance with an example embodiment described herein.

FIG. 14 is a flow chart illustrating a method 1400, according to an example embodiment, for generating interactive content and tracking interactions. The method is performed by processing logic that can comprise hardware (circuitry, dedicated logic, etc.), software (such as is run on a computing device such as those described herein), or a combination of both. In one implementation, the method 1400 is performed by one or more elements depicted and/or described in relation to FIG. 1 and/or FIG. 2 (including but not limited to server 120), while in some other implementations, the one or more blocks of FIG. 14 can be performed by another machine or machines.

At operation 1410, an email can be generated. In certain implementations, such an email can include a selectable element. The selectable element can be associated with a secure transaction identifier. In certain implementations, such an email can be, for example, an 'abandoned cart' email that reflects a purchase that a user may have initiated or expressed interest in (e.g., within a website) but did not complete/execute. Accordingly, the referenced email can include a 'purchase now' selectable element (e.g., button), that, when selected within the email client, can execute/complete the referenced transaction (e.g., without additional input by the user).

At operation 1420, the email can be provided, transmitted, etc., to an email recipient, e.g., as described herein.

At operation 1430, a selection of the selectable element can be received. e.g., from an email client associated with the email recipient.

At operation 1440, in response to the selection, initiating a secure transaction can be initiated, e.g., with respect to the secure transaction identifier.

By way of further illustration, as noted above, in certain implementations the described technologies can store, maintain, or otherwise selectively access (e.g., upon receiving authorization) secure transaction identifiers/information (e.g., payment information such as a credit card number, billing address, shipping address, etc.) that may be associated with a user of device 102 (and/or a recipient of an email described herein). For example, a user's email address can be stored together with the user's credit card/payment information (e.g., billing/shipping information). In doing so, upon receiving (e.g., at server 120) a selection/notification that a user has interacted with/selected an element within an email (e.g., a selectable element that corresponds to an instruction/selection to purchase an item), the execution of such a secure transaction (e.g., in conjunction with the secure transaction information that may be stored in repository 140) can be initiated. Additionally, in certain implementations (e.g., in a scenario in which such a selectable element is selected but the secure transaction information is not stored in repository 140), transaction execution engine 136 can provide such information and/or otherwise coordinate the execution of such a transaction via transaction execution service 152 (which can be, for example, a payment processing service).

It should be noted that though much of the forgoing description is directed to implementations pertaining to generating interactive emails and tracking user interactions, the scope of the present disclosure is not so limited. Accordingly, it should be understood that the technologies described herein can be similarly implemented n any number of other settings and/or contexts. It should be understood that further technical advantages, solutions, and/or improvements (beyond those described and/or referenced herein) may also be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e g, an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-14 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Figure 15:
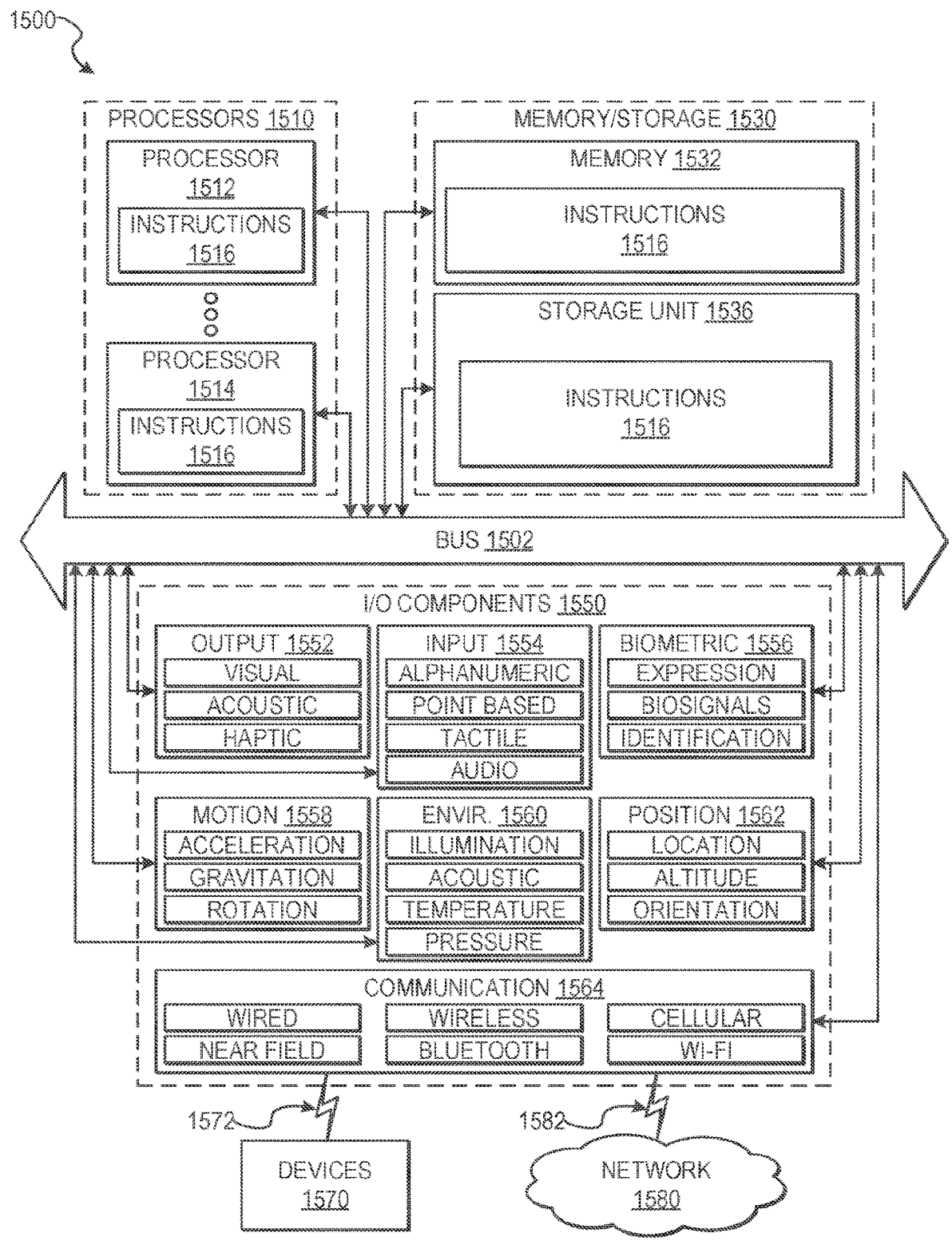
FIG. 15 is a block diagram illustrating components of a machine able to read instructions from a machine-readable medium and perform any of the methodologies discussed herein, according to an example embodiment.

FIG. 15 is a block diagram illustrating components of a machine 1500, according to some example implementations, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. The instructions 1516 transform the general, non-programmed machine into a particular machine programmed to carry out the described and illustrated functions in the manner described. In alternative implementations, the machine 1500 operates as a standalone device or can be coupled (e.g., networked) to other machines. In a networked deployment, the machine 1500 can operate in the capacity of a server machine or a client machine in a server-client network environment, or as a peer machine in a peer-to-peer (or distributed) network environment. The machine 1500 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 can include processors 1510, memory/storage 1530, and I/O components 1550, which can be configured to communicate with each other such as via a bus 1502. In an example implementation, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1512 and a processor 1514 that can execute the instructions 1516. The term "processor" is intended to include multi-core processors that can comprise two or more independent processors (sometimes referred to as "cores") that can execute instructions contemporaneously.

Although FIG. 15 shows multiple processors 1510, the machine 1500 can include a single processor with a single core, a single processor with multiple cores (e.g., a multi-core processor), multiple processors with a single core, multiple processors with multiples cores, or any combination thereof.

The memory/storage 1530 can include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 can also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

As used herein, "machine-readable medium" means a device able to store instructions (e.g., instructions 1516) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine (e.g., processors 1510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1550 can include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 can include many other components that are not shown in FIG. 15. The I/O components 1550 are grouped according to functionality merely for simplifying the following discussion and the grouping is in no way limiting. In various example implementations, the I/O components 1550 can include output components 1552 and input components 1554. The output components 1552 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 1550 can include biometric components 1556, motion components 1558, environmental components 1560, or position components 1562, among a wide array of other components. For example, the biometric components 1556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 can include acceleration sensor components (e.g., accelerometer), gravitation sensor components, rotation sensor components (e.g., gyroscope), and so forth. The environmental components 1560 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 1562 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1550 can include communication components 1564 operable to couple the machine 1500 to a network 1580 or devices 1570 via a coupling 1582 and a coupling 1572, respectively. For example, the communication components 1564 can include a network interface component or other suitable device to interface with the network 1580. In further examples, the communication components 1564 can include wired communication components, wireless communication components, cellular communication components, Near Field Communication (NFC) components. Bluetooth® components (e.g., Bluetooth® Low Energy). Wi-Fi® components, and other communication components to provide communication via other modalities. The devices 1570 can be another machine or any of a wide variety of peripheral devices (e.g., a peripheral device coupled via a USB).

Moreover, the communication components 1564 can detect identifiers or include components operable to detect identifiers. For example, the communication components 1564 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1564, such as location via Internet Protocol (IP) geolocation, location via Wi-Fi® signal triangulation, location via detecting an NFC beacon signal that can indicate a particular location, and so forth.

In various example implementations, one or more portions of the network 1580 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1580 or a portion of the network 1580 can include a wireless or cellular network and the coupling 1582 can be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1516 can be transmitted or received over the network 1580 using a transmission medium via a network interface device (e.g., a network interface component included in the communication components 1564) and utilizing any one of a number of well-known transfer protocols (e.g., HTTP). Similarly, the instructions 1516 can be transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A method comprising:
   receiving a dynamic email within an email client, the dynamic email comprising presentation data;
   rendering the dynamic email within the email client causing a first presentation, from the received presentation data, of a first set of selectable elements at a first selectable elements location and a first content item at a first content item location within the email client;
   receiving, within the email client, a selection of at least one element of the first set of selectable elements; and
   in response to the selection of the at least one element of the first set of selectable elements, concurrently, rendering, within the email client, a second presentation, from the received presentation data, of a second set of selectable elements at the first selectable elements location and a second content item at the first content item location, thereby obscuring, within the email client, the first presentation of the first set of selectable elements and the first content item.

2. The method of claim 1, further comprising:
   adjusting, within the email client, a presentation of at least one of the first set of selectable elements, and the first content item, in response to the selection of the at least one element of the first set of selectable elements.

3. The method of claim 2, wherein adjusting the presentation comprises obscuring the presentation of the at least one of
the first set of selectable elements, and
the first content item, within the email client.

4. The method of claim 1, wherein the dynamic email comprises an email message.

5. The method of claim 1, wherein the dynamic email comprises an email message presenting at least one selectable element for presentation by the email client.

6. The method of claim 5, wherein the at least one selectable element comprises a user interactive control.

7. The method of claim 1, wherein the presentation data comprises a style sheet.

8. The method of claim 1, further comprising, in response to the selection of the at least one element of the first set of selectable elements, one of obscuring or removing from the second presentation the first set of selectable elements and the first content item.

9. The method of claim 1, wherein the first presentation further comprises a message of an event and the first set of selectable elements further comprises an RSVP reply to the event.

10. The method of claim 1, wherein the first presentation further comprises a message regarding a questionnaire and the first set of selectable elements further comprises the questionnaire.

11. The method of claim 1, wherein the first presentation further comprises a message regarding a catalog and the first set of selectable elements further comprises the catalog with image carousels.

12. The method of claim 1, wherein the first presentation further comprises a comment and the first set of selectable elements further comprises a response to the comment.

13. The method of claim 1, wherein the first presentation further comprises a meeting and the first set of selectable elements further comprises a response to the meeting.

14. An email client comprising:
a memory configured to store executable instructions; and
a processor for executing the stored executable instructions to cause the email client to
receive a dynamic email, the dynamic email comprising presentation data,
render the dynamic email causing a first presentation, from the received presentation data, for presentation on a user of a first set of selectable elements at a first selectable elements location and a first content item at a first content item location within the email client,
receive, from a user device, a selection of at least one element of the first set of selectable elements, and
in response to the selection of the at least one element of the first set of selectable elements, concurrently, render, within the email client, a second presentation, from the received presentation data, for presentation on the user device of a second set of selectable elements at the first selectable elements location and a second content item at the first content item location, thereby obscuring, within the email client, the first presentation of the first set of selectable elements and the first content item.

15. The email client of claim 14, wherein the processor for executing the stored executable instructions further causes the email client to adjust a presentation of at least one of
the first set of selectable elements, and
the first content item, in response to the selection of the at least one element of the first set of selectable elements.

16. The email client of claim 15, wherein adjusting the presentation further comprises obscuring the presentation of the at least one of
the first set of selectable elements, and
the first content item, within the email client.

17. The email client of claim 14, wherein the dynamic email comprises an email message.

18. The email client of claim 14, wherein the dynamic email comprises an email message presenting at least one selectable element for presentation by the email client.

19. The email client of claim 18, wherein the at least one selectable element comprises a user interactive control.

20. The email client of claim 14, wherein the presentation data comprises a style sheet.

21. The email client of claim 14, wherein the processor for executing the stored executable instructions further causes the email client to, in response to the selection of the at least one element of the first set of selectable elements, one of obscure or remove from the second presentation the first set of selectable elements and the first content item.

22. A non-transitory computer readable medium storing executable code thereon configured to be executed by a processor of an email client, the executable code including instructions to cause the processor of the email client to:
receive a dynamic email, the dynamic email comprising presentation data,
render the dynamic email to cause a first presentation, from the received presentation data, for presentation on a user of a first set of selectable elements at a first selectable elements location and a first content item at a first content item location within the email client,
receive, from a user device, a selection of at least one element of the first set of selectable elements, and
in response to the selection of the at least one element of the first set of selectable elements, concurrently, render a second presentation, from the received presentation data, for presentation on the user device of a second set of selectable elements at the first selectable elements location and a second content item at the first content item location, thereby obscuring, within the email client, the first presentation of the first set of selectable elements and the first content item.

23. The computer readable medium of claim 22, wherein the instructions further causes the email client to adjust a presentation of at least one of
the first set of selectable elements, and
the first content item, in response to the selection of the at least one element of the first set of selectable elements.

24. The computer readable medium of claim 23, wherein the instructions further causes the email client to adjust the presentation to obscure the presentation of the at least one of
the first set of selectable elements, and
the first content item, within the email client.

25. The computer readable medium of claim 22, wherein the dynamic email comprises an email message.

* * * * *